United States Patent [19]

Ghosh et al.

[11] Patent Number: 5,710,906
[45] Date of Patent: Jan. 20, 1998

[54] PREDICTIVE SNOOPING OF CACHE MEMORY FOR MASTER-INITIATED ACCESSES

[75] Inventors: Subir Ghosh; Hsu-Tien Tung, both of San Jose, Calif.

[73] Assignee: OPTi Inc., Milpitas, Calif.

[21] Appl. No.: 499,610

[22] Filed: Jul. 7, 1995

[51] Int. Cl.[6] .............................. G06F 13/28; G06F 12/08
[52] U.S. Cl. .................................. 395/473; 395/468
[58] Field of Search ................................. 395/473, 451, 395/290, 470, 468

[56] References Cited

U.S. PATENT DOCUMENTS

| 5,341,487 | 8/1994 | Derwin et al. | 395/473 |
| 5,535,363 | 7/1996 | Prince | 395/474 |

OTHER PUBLICATIONS

PCI Special Interest Group, "PCI Local Bus Specification--Production Version" (Apr. 30, 1993), Rev. 2.0.
Intel Corporation, "82433LX/82433NX Local bus Accelerator (LBX)", Advance Information (Apr. 1994), pp. 13–15.
Intel Corporation, "82434LX/82434NX PCI, Cache and Memory Controller (PCMC)", Advance Information (Mar. 1994), pp. 96–103, 152–154.
Intel Corporation, "Pentium™ Processor User's Manua—vol. 1: Pentium Processor Data Book" (1993).

*Primary Examiner*—Eddie P. Chan
*Assistant Examiner*—Kevin L. Ellis
*Attorney, Agent, or Firm*—Fliesler, Dubb, Meyer & Lovejoy

[57] ABSTRACT

When a PCI-bus controller receives a request from a PCI-bus master to transfer data with an address in secondary memory, the controller performs an initial inquire cycle and withholds TRDY# to the PCI-bus master until any writeback cycle completes. The controller then allows the burst access to take place between secondary memory and the PCI-bus master, and simultaneously and predictively, performs an inquire cycle of the L1 cache for the next cache line. In this manner, if the PCI burst continues past the cache line boundary, the new inquire cycle will already have taken place, or will already be in progress, thereby allowing the burst to proceed with, at most, a short delay. Predictive snoop cycles are not performed if the first transfer of a PCI-bus master access would be the last transfer before a cache line boundary is reached.

35 Claims, 11 Drawing Sheets

PREDICTIVE SNOOPING OF CACHE MEMORY FOR MASTER-INITIATED ACCESSES

BACKGROUND

1. Field of the Invention

The invention relates to computer systems in which a host processor and a bus master can access the same address space, and more particularly, to techniques for facilitating burst accesses by such a master.

2. Description of Related Art

In a typical IBM PC/AT-compatible computer system, a host processing unit is coupled to a host bus and most I/O peripheral devices are coupled to a separate I/O bus. The host processing unit typically comprises an Intel i386, i486 or Pentium™ microprocessor, and the I/O bus typically conforms to a standard known as ISA (Industry Standard Architecture). I/O interface circuitry, which usually comprises one or more chips in a "core logic chipset", provides an interface between the two buses. A typical system also includes a memory subsystem, which usually comprises a large array of DRAM and perhaps a cache memory.

General information on the various forms of IBM PC AT-compatible computers can be found in IBM, "Technical Reference, Personal Computer AT" (1985), in Sanchez, "IBM Microcomputers: A Programmer's Handbook" (McGraw-Hill: 1990), in MicroDesign Resources, "PC Chip Sets" (1992), and in Solari, "AT Bus Design" (San Diego: Annabooks, 1990). See also the various data books and data sheets published by Intel Corporation concerning the structure and use of the 80×86 family of microprocessors, including Intel Corp., "Pentium™ Processor", Preliminary Data Sheet (1993); Intel Corp., "Pentium™ Processor User's Manual" (1994); "i486 Microprocessor Hardware Reference Manual", published by Intel Corporation, copyright date 1990, "386 SX Microprocessor", data sheet, published by Intel Corporation (1990), and "386 DX Microprocessor", data sheet, published by Intel Corporation (1990). In addition, a typical core logic chipset includes the OPTi 82C802G and either the 82C601 or 82C602, all incorporated herein by reference. The 82C802G is described in OPTi, Inc., "OPTi PC/AT Single Chip 82C802G Data Book", Version 1.2a (Dec. 1, 1993), and the 82C601 and 82C602 are described in OPTi, Inc., "PC/AT Data Buffer Chips, Preliminary, 82C601/82C602 Data Book", Version 1.0e (Oct. 13, 1993). All the above references are incorporated herein by reference.

Many IBM PC AT-compatible computers today include one, and usually two, levels of cache memory. A cache memory is a high-speed memory that is positioned between a microprocessor and main memory in a computer system in order to improve system performance. Cache memories (or caches) store copies of portions of main memory data that are actively being used by the central processing unit (CPU) while a program is running. Since the access time of a cache can be faster than that of main memory, the overall access time can be reduced. Descriptions of various uses of and methods of employing caches appear in the following articles: Kaplan, "Cache-based Computer Systems," *Computer*, 3/73 at 30–36; Rhodes, "Caches Keep Main Memories From Slowing Down Fast CPUs," *Electronic Design*, Jan. 21, 1982, at 179; Strecker, "Cache Memories for PDP-11 Family Computers," in Bell, *"Computer Engineering"* (Digital Press), at 263–67, all incorporated herein by reference. See also the description at pp. 6-1 through 6-11 of the "i486 Processor Hardware Reference Manual" incorporated above.

Many microprocessor-based systems implement a "direct mapped" cache memory. In general, a direct mapped cache memory comprises a high speed data Random Access Memory (RAM) and a parallel high speed tag RAM. The RAM address of each line in the data cache is the same as the low-order portion of the main memory line address to which the entry corresponds, the high-order portion of the main memory address being stored in the tag RAM. Thus, if main memory is thought of as $2^m$ blocks of $2^n$ "lines" of one or more bytes each, the i'th line in the cache data RAM will be a copy of the i'th line of one of the $2^m$ blocks in main memory. The identity of the main memory block that the line came from is stored in the i'th location in the tag RAM.

When a CPU requests data from memory, the low-order portion of the line address is supplied as an address to both the cache data and cache tag RAMs. The tag for the selected cache entry is compared with the high-order portion of the CPU's address and, if it matches, then a "cache hit" is indicated and the data from the cache data RAM is enabled onto a data bus of the system. If the tag does not match the high-order portion of the CPU's address, or the tag data is invalid, then a "cache miss" is indicated and the data is fetched from main memory. It is also placed in the cache for potential future use, overwriting the previous entry. Typically, an entire line is read from main memory and placed in the cache on a cache miss, even if only a byte is requested. On a data write from the CPU, either the cache RAM or main memory or both may be updated, it being understood that flags may be necessary to indicate to one that a write has occurred in the other.

Accordingly, in a direct mapped cache, each "line" of secondary memory can be mapped to one and only one line in the cache. In a "fully associative" cache, a particular line of secondary memory may be mapped to any of the lines in the cache; in this case, in a cacheable access, all of the tags must be compared to the address in order to determine whether a cache hit or miss has occurred. "k-way set associative" cache architectures also exist which represent a compromise between direct mapped caches and fully associative caches. In a k-way set associative cache architecture, each line of secondary memory may be mapped to any of k lines in the cache. In this case, k tags must be compared to the address during a cacheable secondary memory access in order to determine whether a cache hit or miss has occurred. Caches may also be "sector buffered" or "sub-block" type caches, in which several cache data lines, each with its own valid bit, correspond to a single cache tag RAM entry.

When the CPU executes instructions that modify the contents of the cache, these modifications must also be made in the main memory or the data in main memory will become "stale." There are two conventional techniques for keeping the contents of the main memory consistent with that of the cache—(1) the write-through method and (2) the write-back or copy-back method. In the write-through method, on a cache write hit, data is written to the main memory immediately after or while data is written into the cache. This enables the contents of the main memory always to be valid and consistent with that of the cache. In the write-back method, on a cache write hit, the system writes data into the cache and sets a "dirty bit" which indicates that a data word has been written into the cache but not into the main memory. A cache controller checks for a dirty bit before overwriting any line of data in the cache, and if set, writes the line of data out to main memory before loading the cache with new data.

A computer system can have more than one level of cache memory for a given address space. For example, in a two-level cache system, the "level one" (L1) cache is logically adjacent to the host processor. The second level (L2) cache is logically behind the first level cache, and DRAM memory (which in this case can be referred to as tertiary memory) is located logically behind the second level cache. When the host processor performs an access to an address in the memory address space, the first level cache responds if possible. If the first level cache cannot respond (for example, because of an L1 cache miss), then the second level cache responds if possible. If the second level cache also cannot respond, then the access is made to DRAM itself. The host processor does not need to know how many levels of caching are present in the system or indeed that any caching exists at all. Similarly, the first level cache does not need to know whether a second level of caching exists prior to the DRAM. Thus, to the host processing unit, the combination of both caches and DRAM is considered merely as a single main memory structure. Similarly, to the L1 cache, the combination of the L2 cache and DRAM is considered simply as a single main memory structure. In fact, a third level of caching could be included between the L2 cache and the actual DRAM, and the L2 cache would still consider the combination of L3 and DRAM as a single main memory structure.

As the x86 family of microprocessors has advanced, additional functions have been included on the microprocessor chip itself. For example, while i386-compatible microprocessors did not include any cache memory on-chip, the i486-compatible microprocessors did. Specifically, these microprocessors included a level one, "write-through" cache memory.

Pentium-compatible microprocessors also include a level one cache on-chip. This cache is divided into a data cache and a separate code cache. Unlike the cache included on the i486-compatible microprocessor chips, the data cache on a Pentium chip follows a write-back policy. The cache is actually programmable on a line-by-line basis to follow a write-through or a write-back policy, but special precautions must be taken externally to the chip as long as even one line is to follow a write-back policy as further explained below. Thus, as used herein, a "write-back cache" is a cache memory, any part of which can hold data which is inconsistent with that in the external memory subsystem while an access takes place to the same memory address space by another bus master.

The data cache on a Pentium chip implements a "modified/exclusive/shared/invalid" (MESI) write-back cache consistency protocol, whereas the code cache only supports the "shared" and "invalid" states of the MESI protocol. The MESI protocol is described in "Intel, 'Pentium Processor User's Manual, Vol. 1: Pentium Processor Databook" (1993), incorporated herein by reference, especially at pp. 3-20 through 3-21. In the MESI protocol, each cache data line is accompanied by a pair of bits which indicate the status of the line. Specifically, if a line is in state M, then it is "modified" (different from main memory). In multiprocessor systems in which more than one of the processors has a cache, state M also indicates that the line is available in only one cache. An M-state line can be accessed (read or written) by the host processor unit without sending a cycle out on an external bus to higher levels of the memory subsystem.

If a cache line is in state E ("exclusive"), then it is not "modified" (i.e. it contains the same data as subsequent levels of the memory subsystem). In shared cache systems, state E also indicates that the cache line is available in only one of the caches. The host processor unit can access (read or write) an E-state line without generating a bus cycle to higher levels of the memory subsystem, but when the host processor performs a write access to an E-state line, the line then becomes "modified" (state M).

A line in state S ("shared") may exist in more than one cache. A read access by the host processor to an S-state line will not generate bus activity, but a write access to an S-state line will cause a write-through cycle to higher levels of the memory subsystem in order to permit the sharing cache to potentially invalidate its own corresponding line. The write will also update the data in the data cache line.

A line in state I is invalid. It is not available in the cache. A read access by the host processor unit to an I-state line will generate a "cache miss" and may cause the cache to execute a line fill (fetch the entire line into the cache from higher levels of the memory subsystem). A write access by the host processor unit to an I-state line will cause the cache to execute a write-through cycle to higher levels of the memory subsystem.

Computer system cache memories typically cache main memory data for the CPU. If the cache uses a write-back protocol, then frequently the cache memory will contain more current data than the corresponding lines in main memory. This poses a problem for other bus masters (and for other CPUs in a multiprocessor system) desiring to access a line of main memory, because it is not known whether the main memory version is the most current version of the data. Write-back cache controllers, therefore, typically support inquire cycles (also known as snoop cycles), in which a bus master asks the cache memory to indicate whether it has a more current copy of the data.

In Pentium-based systems, a bus master initiates an inquire cycle by driving the inquire address onto the CPU address leads and asserting EADS#. The processor responds by asserting its HIT# output if the specified data line is present in the L1 cache. The processor also asserts an HITM# output if the specified L1 cache line is in the M (modified) state. Thus, HITM#, when asserted, indicates that the L1 cache contains a more current copy of the data than is in main memory. The processor then automatically conducts a write-back cycle while the external bus master waits. By this process, therefore, the external bus master will be able to access the desired line in main memory without any further concern that the processor's L1 cache contains a more current copy of the data.

One of the bottlenecks that has limited the performance of personal computers in the past has been the maximum specified speed of the ISA bus. The original IBM PC AT computers manufactured by IBM Corp., the I/O bus operated with a data rate of 8 MHz (BCLK=8 MHz). This was an appropriate data rate at that time since it was approximately equivalent to the highest data rates which the CPUs of that era could operate with on the host bus. CPU data rates are many times faster today, however, so the slow speed of the I/O bus severely limits the throughput of systems today. One solution for this problem has been the development of a local bus standard, by which certain devices which were traditionally located on the I/O bus can now be located on the host bus. This standard, referred to herein as the VESA (Video Electronics Standards Association) or VL-Bus standard, is defined in VESA, "VESA VL-Bus Local Bus Standard", Revision 1.0 (1992), and in VESA, "VESA VL-Bus Proposal, Version 2.0p, Revision 0.8p (May 17, 1993), both incorporated herein by reference.

Another solution to the problem has been the development of another standard, referred to herein as the PCI standard, defined in PCI Special Interest Group, "PCI Local Bus Specification Revision 2.0" (Apr. 30, 1993), incorporated herein by reference. As used herein, the term "PCI bus" refers to a bus which adheres to this specification, whether or not it also adheres to subsequent revisions of the specification. The PCI bus achieves very high performance, in part because its basic data transfer mode is by burst. That is, data is always transferred to or from a PCI device in a known sequence of data units defined by a known sequence of data unit addresses in an address space. In the "cache line" burst mode, exactly four transfers take place. In the "linear" burst mode, any number of transfers (including 1) can take place to/from linearly sequential addresses until either the initiator or the target terminates the transaction. In either mode, the initiator need only specify the starting address because both parties know the sequence of addresses which follow.

Because of the burst mode of PCI masters, the problem of performing inquire cycles is somewhat more difficult when the bus master is a PCI-bus master than when it is a CPU bus master or ISA-bus master. According to the Pentium databooks, every data transfer to or from the memory address space which is cached by the L1 cache should be preceded by an inquire cycle. This would severely hamper the performance of PCI masters performing burst cycles to or from secondary memory. Many PCI-bus controller chipsets speed up these transfers by performing an inquire cycle only once per cache line instead of on each data transfer. These controllers simply assume that no change will be made to the cache line contents during the remainder of the PCI-bus master burst transfer with the corresponding line of secondary memory. The Intel 82433LX local bus accelerator, for example, maintains a PCI-to-memory read prefetch buffer equal in depth to the length of one cache line, so that if the Pentium processor performs a write-back cycle in response to the inquire cycle, the local bus accelerator chip can capture the remaining words of the cache line for easy completion of further PCI-bus master read accesses within the burst. The 82433LX is described in Intel, "82340 PCIset Cache/Memory Subsystem" (Apr. 1994), incorporated herein by reference.

Even with inquire cycles limited to one per cache line, a problem still exists if the desired burst length proceeds past a cache line boundary. Conventional chipsets determine when a new access in the burst is in a new cache line, and they withhold the PCI-bus TRDY# signal while they perform the necessary inquire cycle for the new cache line. If the Pentium processor asserts HITM#, then the chipset stops the PCI-bus transaction (using a target disconnect termination), allows the L1 cache to perform a write-back operation, and resumes with a new inquire when the PCI master restarts the transaction where it left off. Some chipsets do not stop the PCI-bus transaction, but rather merely withhold TRDY# until the write-back cycle and new inquire cycle are complete, but this violates the PCI-bus specification which calls for a maximum delay of eight PCI-bus clock cycles before a target asserts a TRDY# within a burst. If the inquire cycle for the new line of cache does not produce HITM#, then there is no need to stop the PCI transaction. Instead, conventional chipsets merely withhold TRDY# for the time required to perform the inquire cycle, and then assert TRDY# when the inquire cycle has completed without HITM#.

The time required to perform the inquire cycle, however, is significant. On the PCI-bus, a delay of eight PCI-bus clock cycles may be incurred each time that a linear burst transaction crosses a cache line boundary. A definite need, therefore, exists for a mechanism which allows PCI-bus bursts to proceed past a cache line boundary whenever possible. Such a mechanism can help PCI-bus masters achieve the full promise of high-speed data transfers afforded by the PCI-bus burst transfer protocol.

SUMMARY OF THE INVENTION

According to the invention, roughly described, when a PCI-bus controller receives a request from a PCI-bus master to transfer data with an address in secondary memory, the controller performs an initial inquire cycle and withholds TRDY# to the PCI-bus master until any write-back cycle completes. The controller then allows the burst access to take place between secondary memory and the PCI-bus master, and simultaneously and predictively, performs an inquire cycle of the L1 cache for the next cache line. In this manner, if the PCI burst does in fact continue past the cache line boundary, the new inquire cycle will already have taken place (or will already be in progress), thereby allowing the burst to proceed with at most a short delay absent a hit-modified condition. This avoids the need to incur the penalty of stopping the transfer on the PCI bus and restarting it anew at a later time, every time a linear burst transaction crosses a cache line boundary.

In one embodiment, predictive snoop cycles are not performed if the first transfer of a PCI-bus master access would be the last transfer before a cache line boundary is reached, since no advantage would be obtained. In another embodiment, predictive snoop cycles are performed if the first transfer of a PCI-bus master access would be the second-to-last transfer before a cache line boundary is reached, even though some delay will be experienced before the transfer of the first data unit of the next cache line due to the predictive snoop cycle and synchronization delays.

Although the invention is described herein with respect to a PCI-bus Pentium system, its usefulness is not limited to such systems. The invention is useful whenever an L1 cache is present which can use a write back protocol, and which supports inquire cycles, and whenever an I/O bus is present which has a linear-incrementing capability or mode which can continue beyond an L1 cache line boundary.

BRIEF DESCRIPTION OF THE DRAWINGS

The invention will be described with respect to particular embodiments thereof, and reference will be made to the drawings, in which.

DETAILED DESCRIPTION

I. HARDWARE OVERVIEW

Figure 1:
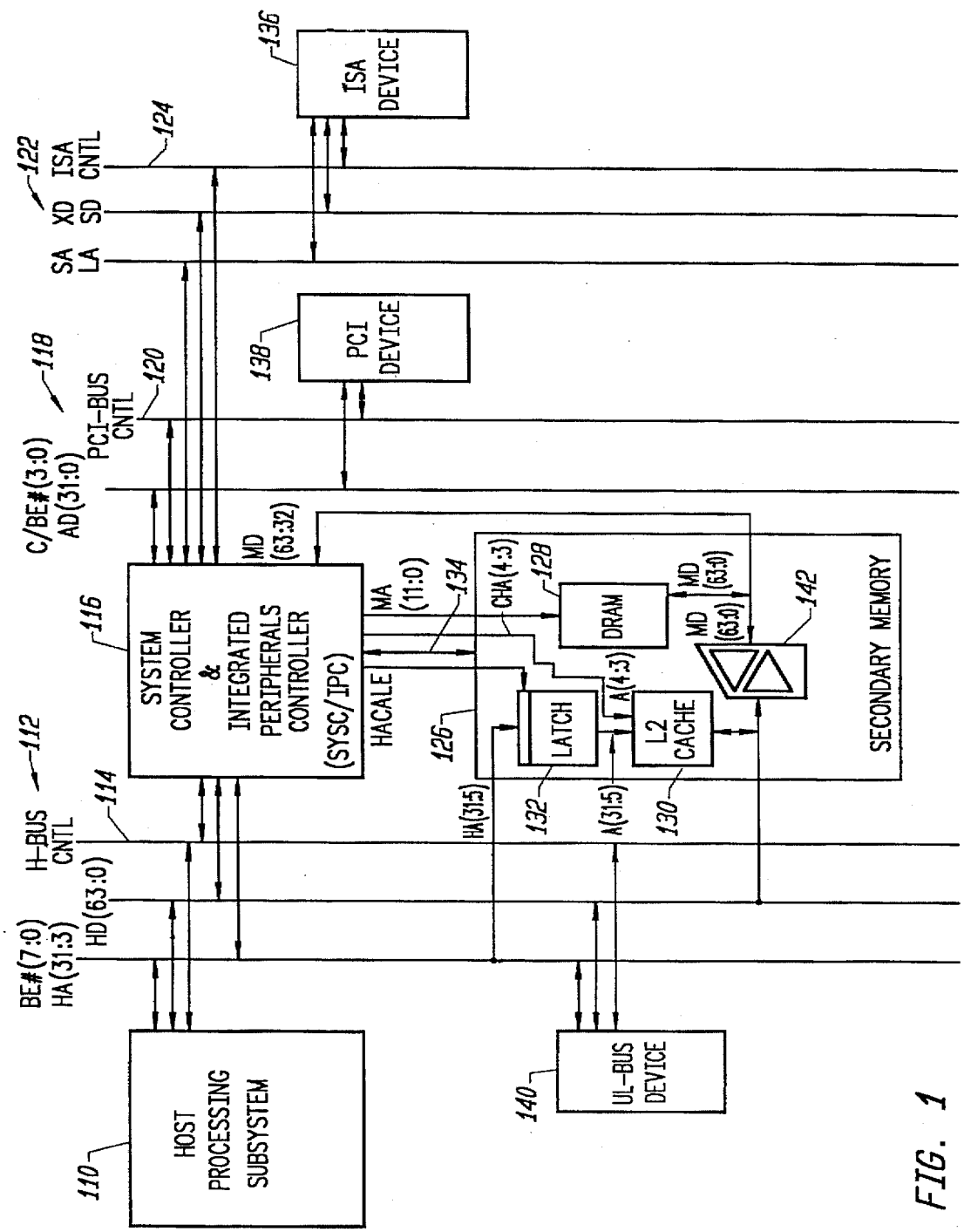
FIG. 1 is an over-all block diagram illustrating pertinent features of a computer system incorporating the invention.

FIG. 1 is an overall block diagram illustrating pertinent features of a computer system incorporating the invention. The system includes a host processing subsystem 110 connected to a host bus 112. The host bus 112 includes address lines (including HA(31:3) and BE#(7:0)), data lines HD(63:0) and various control lines designated generally as 114. A core logic chipset in the system includes a system controller (SYSC) and an integrated peripherals controller (IPC), indicated generally as 116. The SYSC/IPC 116 is connected to the host bus 112, and is also connected to a PCI-bus 118. The PCI-bus 118 includes command and address lines C/BE#(3:0) and AD(31:0), respectively, as well as PCI-bus control lines 120. The SYSC/IPC 116 is also connected to an ISA bus 122, which includes address lines SA and LA, data lines SD and XD, and various ISA control lines 124. The SYSC/IPC is also connected to a secondary memory subsystem 126, which is also connected to the address and data leads of the host bus 112. The secondary memory subsystem 126 includes DRAM 128, the address inputs of which are connected via lines MA(11:0) to outputs of the SYSC/IPC 116, and the data port MD(63:0) of which is coupled to the data lines of host bus 112 via a bi-directional buffer 142. The high order 32 bits of the data port, MD(63:32), are also connected back to the SYSC/IPC 116. The secondary memory subsystem 126 also includes a second-level cache 130, the data port of which is connected to the host bus 112 data lines. The high-order bits of the address port for the cache 130 are connected to the output of an address latch 132, the input port of which is connected to receive address lines HA(31:5) from the host bus 112. The next two lower order bits A(4:3) for the address port of L2 cache 130 are driven by signals CHA(4:3) from the SYSC/IPC 116. The secondary memory subsystem 126 communicates via control lines 134 with the SYSC/IPC 116. Various additional buffers and latches are included in the system as well, but they are omitted from FIG. 1 for simplicity of illustration.

The host processing subsystem 110 is, in a preferred embodiment, a Pentium™ chip manufactured by Intel Corporation, Santa Clara, Calif. The Pentium processor is described in the following documents, all incorporated herein by reference: Intel Corporation, "Pentium™ Processor", Preliminary Data Sheet (1993); Intel Corporation, "Pentium™ Processor at iCOMP™ Index 735\90 MHz" (Mar. 1994); and Intel Corporation, "Pentium™ Processor User's Manual" (1994).

Figure 2:
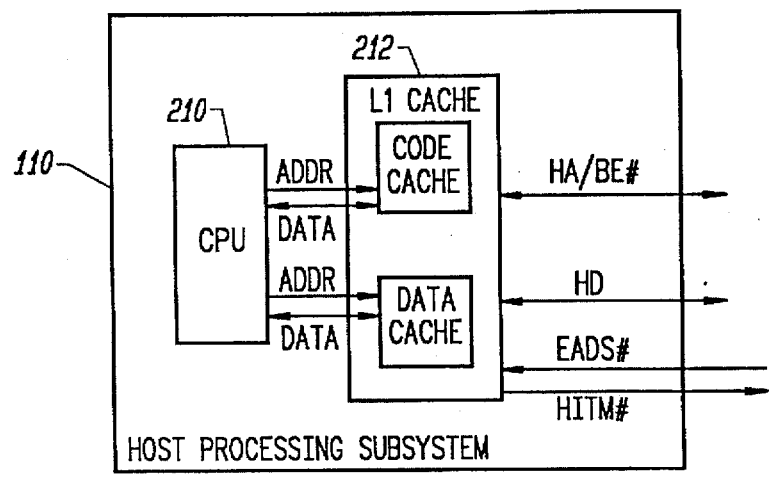
FIG. 2 is a block diagram of parts of the host processing subsystem of FIG. 1.

FIG. 2 is a block diagram of pertinent parts of the host processing subsystem 110. It comprises a CPU 210 which communicates with a first-level (L1) cache 212. The L1 cache 212 contains separate code and data caches, each of which communicates with the CPU 210 via separate communication paths. The L1 cache 212 also communicates with the address and data lines of host bus 112, as well as several of the control lines 114. Two of the control lines 114 are shown specifically in FIG. 2, namely, EADS# and HITM#. The L1 cache 212 caches addresses in a main memory address space for the CPU 210. Although the L1 cache 212 and the CPU 210 are both fabricated together on a single chip in the Pentium processor, in a different embodiment they may occupy two or more chips.

The code cache and data cache each have a 32-byte line size and are two-way set associative. These caches also have dedicated translation look-aside buffers (TLBs). The data cache is configurable to be write-back or write-through on a line-line basis, and follows the MESI protocol described above. The tag RAMs of the data cache and code cache are each triple-ported as viewed from the CPU 210, and the code cache is inherently write-protected. The caches can be enabled or disabled, page by page, by software or hardware.

Because at least one line of L1 cache 212 supports a write-back protocol, the host processing subsystem 110 also supports inquire cycles, initiated by the external system to determine whether a line of secondary memory is currently being cached in the L1 cache 212 and whether it has been modified in that cache. An external bus master (external to the host processing subsystem 110) (SYSC/IPC 116 in the system of FIG. 1) drives inquire cycles to the host processing subsystem 110 prior to an access (read or write) to the secondary memory subsystem 126, in order to ensure that the secondary memory subsystem 126 contains the latest copy of the data. If the host processing subsystem 110 has the latest copy of the data (i.e., the data is cached modified in the L1 cache 212), then, as soon as permitted by the SYSC 116 and at least for the Pentium processor, the Pentium performs a write-back of the specified data line before the access by the external master is allowed to take place.

An inquire cycle is initiated by the external device by first asserting HOLD or AHOLD to the Pentium processor in order to force the Pentium to float its address bus. Alternatively, the Pentium processor may be forced off the bus due to BOFF#. The external device then drives an inquire address onto the Pentium address leads, drives an INV signal and asserts EADS#. Because the entire 32-byte cache line is affected by an inquire cycle, the inquire address need only include address bits 31:5. These bits are sufficient to identify a "line address". As used herein, a line address is the portion of an address necessary to uniquely identify a data unit of the size of one cache line (32 bytes for the Pentium). Similarly, a "byte address" includes all address bits since they are all needed to uniquely identify a desired byte, and, in general, a "data unit address" includes whatever address bits are required to uniquely specify an item having the number of bytes in the data unit.

The INV signal indicates to the Pentium processor whether the L1 cache line should be invalidated (INV=1) or mark the cache line as shared (INV=0) in the event of an inquire hit. In the embodiment described herein, INV=1 is sufficient for all cases.

The EADS# signal is the signal which initiates the inquire cycle. The Pentium processor recognizes EADS# two clock cycles after an assertion of AHOLD or BOFF#, or one clock cycle after assertion of HLDA. The Pentium processor ignores EADS# in the clock cycle after EADS# was originally asserted, and also if none of HLDA, AHOLD and BOFF# are active, and also during external snoop write-back cycles as described below.

Two clock cycles after the Pentium samples EADS# asserted, it returns HIT# and HITM# output signals. It returns HIT# asserted if the inquire address hit a line in either the code or data cache in L1 cache 212. It returns HIT# deasserted (high, negated) at the same time if the inquire cycle missed both internal caches. The HIT# output signal is not important to an understanding of the invention.

Also, two host clock cycles after the processor samples EADS# asserted, the Pentium processor returns an HITM# output. It returns HITM# asserted only if the inquire cycle hit a modified line in the data cache of L1 cache 212. This indicates to the external device that the L1 cache 212 contains the most current copy of the data and the external device should await a write-back of the data to secondary memory 126 before reading or writing to any byte within that line. If HITM# is returned asserted, then it remains asserted until two clocks after the last BRDY# of the write-back cycle is asserted.

If the processor returns HITM# asserted, then the external device should release the host bus 112 to allow the Pentium processor to perform a write-back cycle. ADS# for the write-back cycle will occur no earlier than two host bus clock cycles after assertion of HITM#. The 32-byte cache line is then written back from L1 cache 212 into secondary memory 126 using the i486-type burst protocol. Note that in certain situations, the Pentium processor may not perform a write-back. Whether or not a write-back is performed, the processor negates HITM# when the L1 cache 212 is consistent with the secondary memory subsystem 126 and the external device can proceed to access the desired memory location in secondary memory 126. Note that if the external device asserted HOLD to the processor to perform the inquire cycle, the processor waits until HOLD is negated before performing the write-back cycle.

Note that different embodiments can have a wide variety of different kinds of host processing subsystems. For example, they can include a "level 0" cache between the CPU and the L1 cache; they can include one or multiple processors; they can include bridges between the host bus 112 and a bus protocol expected by a CPU in the host processing subsystem, and so on. As a group, however, all the components of the host processing subsystem use an L1 cache to cache at least some lines of the secondary memory address space.

As used herein, a line of data in secondary memory is "cached" if data identified to that line in secondary memory is temporarily stored in a cache memory. The data stored in the cache memory can either be the same as or different from the data stored in the corresponding line of secondary memory. If the processing unit for which the cache is caching the line of data has modified the version of the data stored in the cache, then the data is referred to as "cached modified".

Returning to FIG. 1, the SYSC/IPC 116 comprises the following integrated circuit chips available from OPTi, Inc., Santa Clara, Calif.: 82C557 (SYSC) and 82C558 (IPC). These chips are described in OPTi, Inc., "Viper-M 82C556M/82C557M/82C558M, Data Book, Version 1.0" (April 1995), incorporated by reference herein. The chipset also includes an OPTi, Inc. 82C556 data buffer controller (DBC), also described in the above-incorporated data book, which includes some buffers not shown in FIG. 1.

Briefly, the SYSC provides the control functions for interfacing with host processing subsystem 110, the 64-bit-wide L2 cache 130, the 64-bit DRAM 128 data bus, an interface to VL-bus aspects of the host bus 112, and an interface to the PCI-bus 118. The SYSC also controls the data flow between the host bus 112, the DRAM bus, the local buses, and the 8/16-bit ISA bus. The SYSC interprets and translates cycles from the CPU, PCI-bus masters, ISA-bus masters, and DMA to the secondary memory subsystem 126, local bus slaves, PCI-bus slaves, or ISA-bus devices.

The IPC contains an ISA-bus controller and includes the equivalent of an industry standard 82C206, a real time clock interface, a DMA controller, and a power management unit.

The SYSC/IPC 116 is described in more detail below.

The secondary memory subsystem 126, as previously mentioned, includes a level-two (L2) cache. However, no level-two cache is required to implement the invention because the secondary memory subsystem 126 is basically an opaque subsystem as viewed from the circuitry in SYSC/IPC 116 which is concerned with the methods of the present invention. If a second-level cache 130 is included in secondary memory subsystem 126, the latch 132 is advantageously included as well for reasons which will become apparent. The latch is enabled by an HACALE signal (not shown in FIG. 1) from SYSC/IPC 116 to the secondary memory subsystem 126.

Because the secondary memory subsystem 126 is essentially opaque for the purposes of the present embodiment, other memory structures may be included as well. For example, a third-level cache may be included in the secondary memory subsystem 126. Also, as is well known, while the secondary memory address space is continuous in the system of FIG. 1, actual memory location storage need not be present in the secondary memory subsystem 126 for all of the memory locations in that address space. Accesses made to memory addresses which do not have storage locations the secondary memory subsystem 126 are recognized by the SYSC/IPC 116 and handled in a known manner.

Referring again to FIG. 1, the PCI-bus 118 conforms to the PCI local bus specification as described in PCI Special Interest Group, "PCI Local Bus Specification, Product Version, Revision 2.0" (Apr. 30, 1993), incorporated herein by reference. The address and data lines of the PCI bus are multiplexed. Specifically, AD(31:0) carry data during the data phases of a PCI-bus transaction, and carry an address during an address phase of the PCI-bus transaction. C/BE# (3:0) carry a command during the address phase and carry byte enables during the data phases. The PCI-bus follows a burst transfer protocol. A "transaction" on the PCI-bus comprises an address phase and one or more data phases. All signals on the PCI-bus which are pertinent to the present discussion are sampled on the rising edge of a PCI-bus clock signal (part of PCI-bus control lines 120).

All PCI data transfers are controlled using the following three PCI-bus signals: FRAME#, IRDY# and TRDY#. The PCI-bus master asserts FRAME# to indicate the beginning of a transaction, and negates it to indicate the end of a transaction. The master asserts IRDY# to enable an individual data transfer, and negates it to force a wait state. The target of a transaction asserts TRDY# to enable a data transfer and negates it to force a wait state. These data transfers may be either read or write data transfers; the master is the initiator, and the target is the responding device, whether the access is for read or write.

When both FRAME# and IRDY# are negated, the interface is considered idle. To start a transaction, after arbitration if appropriate, the initiator of the transaction drives a starting Dword (4-byte) address onto the AD lines and asserts FRAME#. The target of the transaction, which in the case of the present invention will typically be the SYSC/IPC 116, recognizes FRAME# on the first PCI-clock rising edge while FRAME# is asserted. The next rising edge of the PCI-clock begins the first of one or more data phases. Data will be transferred between initiator and target in response to each rising edge of the PCI-clock for which both IRDY# and TRDY# are asserted. Either party to the transaction may insert a wait cycle by temporarily negating IRDY# or TRDY#, respectively. According to the PCI-bus specification, the target can withhold its first assertion of TRDY# for any number of PCI-bus clock cycles, but after the first data transfer, it can negate TRDY# only for a predefined maximum number of PCI-bus clock cycles (e.g., seven).

As mentioned, during the address phase of a PCI-bus transaction, the AD(31:0) lines need only specify a dword address. Thus, AD(1:0) are available for other purposes. For memory commands, if AD(1)=0, then AD(0) indicates which of two types of bursting is desired for the upcoming transaction. AD(0)=0 indicates linear incrementing bursting, and AD(0)=1 indicates cache line toggle bursting mode (which is similar to the dword ordering used for i486 cache line fills). In the linear incrementing burst mode, the address for data transfers is assumed by both parties to the transaction to increment by one dword (4 bytes) after each data phase until the transaction is terminated. Note that since the data transfer width is only one dword (two Dwords if the PCI-bus 64-bit extension is used), and since the linear incrementing mode places no restrictions on a transaction relative to the size or arrangement of data lines in any caches which may be present in the system, it will frequently be the case that a PCI-bus transaction begins in one cache line and ends in another cache line, crossing one or more cache line boundaries in the process.

In the linear incrementing burst mode, a transaction continues until it is terminated. Either the initiator of the transaction or the target can initiate a termination, although completion of the termination is always handled by the master by negating FRAME# and IRDY#.

The master terminates the transaction by indicating that the last data phase is in progress. It does so by negating FRAME# during its final assertion of IRDY#. The target can delay TRDY# as usual, so the final data transfer will not occur until the target finally does assert TRDY#. After the final transfer takes place, the master negates IRDY#, placing the PCI-bus in idle condition. Other master-initiated terminations are possible as well, but they are not important for an understanding of the invention.

The target can initiate a termination of the transaction by asserting the PCI-bus STOP# signal. STOP# requests the master to terminate the transaction. A final data transfer may or may not take place while STOP# is asserted, depending on the state of TRDY# at the time STOP# is asserted. When the master samples STOP# asserted, it negates FRAME# on the first PCI-bus clock cycle thereafter in which IRDY# is asserted. The target then negates STOP# in the clock cycle immediately following negation of FRAME#. Again, other forms of target-initiated termination are possible on the PCI-bus, but these are not important for an understanding of the invention.

Referring again to FIG. 1, ISA-bus 122 preferably is included in the system, although it is not necessary to an embodiment of the invention. The signal lines and data transfer protocols on ISA-bus 122 are described in the following documents, all incorporated herein by reference: IBM, "Technical Reference, Personal Computer AT" (1985); Sanchez, "IBM Microcomputers: A Programmer's Handbook" (McGraw-Hill: 1990); MicroDesign Resources, "PC Chip Sets" (1992); Solari, "AT Bus Design" (San Diego: Annabooks, 1990).

Also shown in FIG. 1 for completeness are an ISA-bus device 136 connected to the ISA-bus 122, a PCI-bus device 138 connected to the PCI-bus 118, and a VL-bus device 140 connected to the host bus 112. The ISA- and PCI-bus devices 122 and 118 each conform to the specifications for their respective buses, and each can act as either a master or a slave on their respective buses. The VL-bus device 140 conforms to the VL-bus standard, defined in Video Electronics Standard Association, "VESA VL-Bus Local Bus Standard", Revision 1.0 (1992), although it can act only as a slave.

Figure 3:
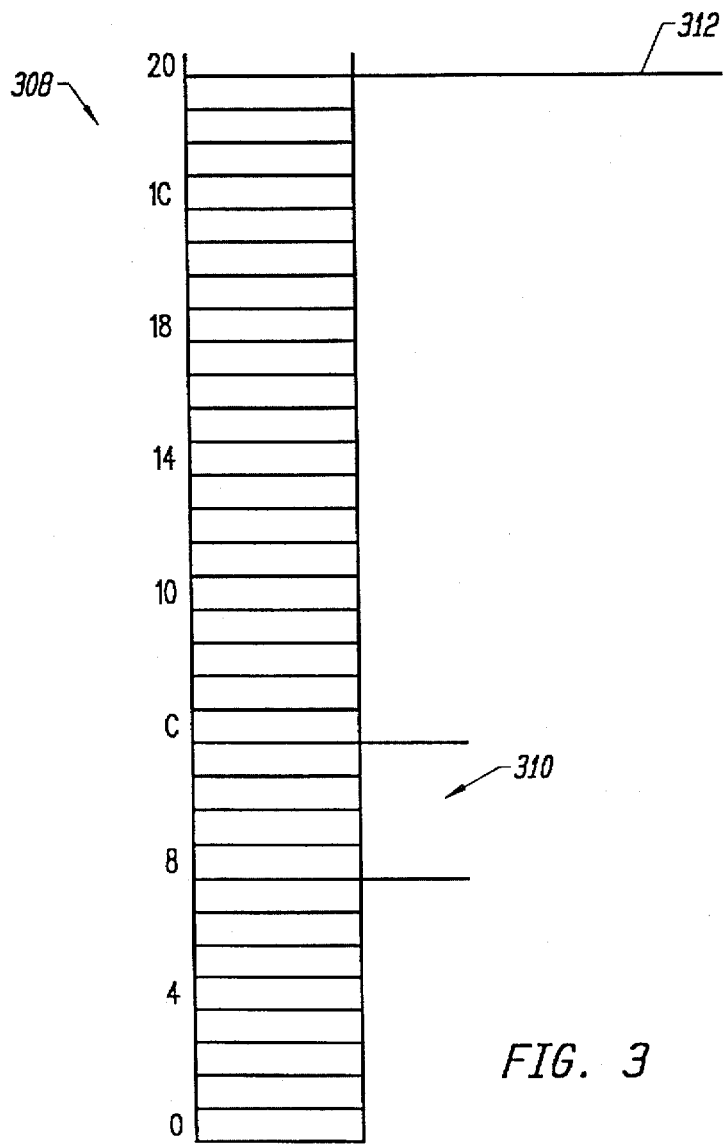
FIG. 3 illustrates a region in the secondary memory address space in the system of FIG. 1.

In order to define certain terms used herein, FIG. 3 illustrates a region in the secondary memory address space in the system of FIG. 1. It comprises a sequence of bytes at sequential addresses 0 through 20 (hexadecimal). A sequential memory access will proceed from bytes at lower addresses to bytes at higher addresses in FIG. 3. In another embodiment, or in another description of the present embodiment, the numerical designations of byte addresses can be reversed, so that a sequential read access proceeds from higher numbered addresses to lower numbered addresses; but this is merely nomenclature and does not affect the structure or operation of the system. As used herein, sequential read and write accesses proceed from "lower" data units in the secondary memory address space to "higher" data units in the secondary memory address space.

FIG. 3 also illustrates a memory "location" 310 which, for the present embodiment, is four bytes long. The entire set of memory locations illustrated in FIG. 3 is designated 308. FIG. 3 also illustrates a 32-byte "boundary" 312, between a 32-byte block spanning addresses 0-1F and the "next higher" 32-byte block beginning at address 20. Moreover, since the L1 cache in a Pentium system has a 32-byte line size, each line of the cache being aligned at 32-byte boundaries in the secondary memory address space, the boundary 312 also represents a "cache line boundary" between the line whose highest data unit includes secondary memory address 1F, and the cache line whose lowest, or first, data unit includes the byte at address 20.

II. SYSTEM OPERATION

A. Starting Quad Word 00, No HITM#

Figure 4:
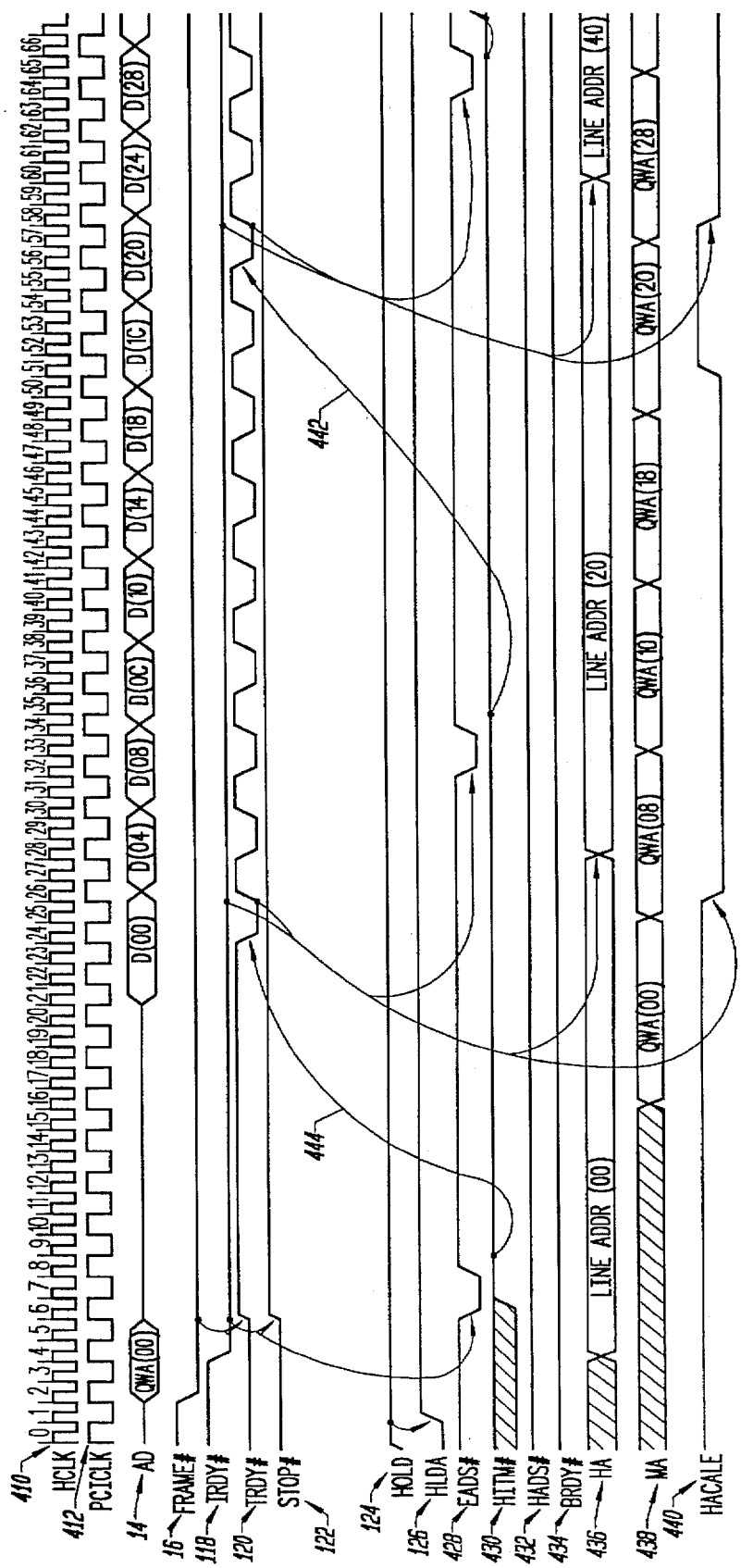
FIGS. 4–7 are timing diagrams illustrating the operation of the system of FIG. 1.

FIG. 4 is a timing diagram illustrating the operation of the system of FIG. 1 in a situation where a PCI master has requested a burst read access to an address at the beginning of a cache line-sized block in the secondary memory address space (i.e., the low-order five bits of the address are 0, referred to herein by the shorthand that the address ends in '00'). In the illustration of FIG. 40 it is assumed that neither the first cache line to be accessed (with cache line address ending in 00), nor the second cache line to be accessed (with cache line address ending in 20) is cached modified in either the L1 or L2 caches. Either or both lines may be present in the L1 cache, but not in a modified state. It is assumed that neither line is present in the L2 cache 130.

Waveform 410 illustrates the host clock signal (HCLK), and waveform 412 illustrates the PCI clock signal (PCICLK). In the present embodiment, the PCICLK operates at half the frequency of the HCLK signal, although the SYSC 116 is programmable to operate the PCICLK at different speeds relative to HCLK. The HCLK clock periods are enumerated across the top of FIG. 4, beginning with HCLK clock period 0. Since the PCICLK signal operates at half the frequency of the HCLK signal, an event which occurs during a PCICLK period that spans HCLK periods 18 and 19, for example, will be referred to herein as taking place during the PCICLK period 18/19. All clock periods begin on a rising edge of the respective clock signal in the present embodiment, but it will be understood that in another embodiment, clock periods may be considered to begin on a falling edge of the clock signal.

Prior to the events illustrated in FIG. 4, it is assumed that a PCI-bus master has already arbitrated for, and been granted, control of the PCI-bus 118 (FIG. 1). In HCLK period 0, the system controller 116 asserts HOLD to the host processing subsystem 110, as illustrated in waveform 424 (FIG. 4). The system controller 116 maintains HOLD asserted for the entire burst transfer.

On the HCLK rising edge which begins HCLK period 1, the host processing subsystem 110 recognizes HOLD asserted, and asserts HLDA in response, as illustrated in waveform 426. HLDA remains asserted for the entire burst transfer. The processor is now off the host bus 112, and inquiry and data transfer cycles can proceed.

In PCI clock cycle 2/3, the PCI master device 138 places the dword address of the first desired transfer onto the AD lines of the PCI-bus 118. It also at this time places a command on the C/BE# lines of PCI-bus 118, and asserts FRAME# to the system controller 116. (See waveforms 414 and 416.) As mentioned, this address ends in '00', and designates the first quad word in a cache-line-sized block of the secondary memory address space. The system controller 116 translates this address onto the host bus address lines HA(31:3) as illustrated in waveform 436.

As illustrated in waveform 418, the PCI device 138 asserts IRDY# during PCI clock cycle 4/5 to indicate that the address is now valid. The PCI device 138 is assumed for the purposes of FIG. 4 to be a fast device, which does not require any wait states. As shown in waveform 418, therefore, PCI device 138 maintains IRDY# asserted for the entire burst transfer.

At the beginning of PCI clock cycle 6/7, the system controller 116 samples FRAME# and IRDY# both asserted, and in response thereto, negates TRDY# (waveform 420) and STOP# (waveform 422) (they were previously floating). It also asserts EADS# to the host processing subsystem 110 in order to begin an inquiry cycle (waveform 428). The negation of TRDY# prevents any data transfers from taking place before the system has confirmed that secondary memory contains the latest copy of the data. The system controller 116 negates EADS# in the second HCLK cycle after assertion, i.e., in HCLK period 8.

Since the desired address is assumed not to be cached modified in the L1 cache 212 (FIG. 2), the host processing subsystem 110 negates its HITM# output within two HCLK clock cycles after EADS# was asserted. Thus, by the beginning of HCLK period 9, HITM# has been negated. (See waveform 430.) The system controller 116 is programmable to sample HITM# on either the second or the third HCLK rising edge after asserting EADS#, but it is assumed herein that the system controller 116 has been programmed to sample HITM# on the second HCLK rising edge after asserting EADS#. Thus, by the beginning of HCLK period 9, the system controller 116 knows that DRAM 128 (FIG. 1) contains the latest copy of all of the data in the L1 cache-line-sized-block that contains the address of the first transfer desired by the PCI device 138. As illustrated in waveform 438, the quad word address for the first transfer is provided by the system controller 116 to the DRAM 128 via MA(11:0) in about HCLK cycle 16. The DRAM 128 is page mode accessed, but it is assumed for simplicity that no new page needs to be established prior to the transfer.

Note that some of the signals described in this specification are asserted high, whereas others are asserted low. As used herein, signals which are asserted low are given a '#' or 'B' suffix in their names, whereas those asserted high (or for which an assertion polarity has no meaning) lack a '#' or 'B' suffix. Also, two signal names mentioned herein that are identical except that one includes the '#' or 'B' suffix while the other omits it, are intended to represent logical compliments of the same signal. It will be understood that one can be generated by inverting the other, or both can be generated by separate logic in response to common predecessor signals.

The data port of DRAM 128, MD(63:0), is eight bytes wide (one quad word), whereas the data path on the PCI-bus 118, AD(31:0), is only four bytes wide (one double word (Dword)). Thus, as illustrated in waveforms 414 and 438 in FIG. 4, two Dwords are transferred over the PCI-bus 118 for each new address asserted to the address port of DRAM 128. The low-order Dword for the first quad word of the transfer appears on AD(31:0) in PCICLK cycle 21/22. On the rising edge that begins PCICLK CYCLE 24/25, the system controller 116 latches the high-order Dword of the data access and increments the DRAM memory address to the next quad word (to an address ending in 08). The system controller 116 also asserts TRDY# at this time. The new quad word address 08 appears on MA(11:0) in HCLK cycle 25, and the first data transfer on the PCI-bus, of Dword 00, takes place on the rising edge of the PCICLK which begins PCICLK cycle 26/27. Although not necessary for the present illustration, in which L2 has a cache miss, the system controller 116 also negates HACALE to the latch 132 (FIG. 1) at the beginning of HCLK cycle 26 for reasons which will become apparent hereinafter.

Note that TRDY# is negated at the beginning of PCICLK cycle 26/27 in order to insert a wait state in the PCI-bus transfer. In another embodiment of the present invention, a wait state may not be necessary.

The system controller 116 drives the previously latched high-order Dword from quad word 00 onto the PCI-bus 118 AD(31:0) lines in PCICLK cycle 26/27, and asserts TRDY# in PCICLK cycle 28/29. In PCICLK cycle 30/31, the system controller 116 drives the low-order Dword of quad word 08 onto AD(31:0), and negates TRDY#. In PCICLK cycle 32/33, system controller 116 asserts TRDY#, latches internally the high-order Dword of quad word 08 from the DRAM 128, and increments the quad word address on MA(11:0) to the DRAM 128. On the rising edge which begins PCICLK cycle 34/35, this data is transferred to the PCI device 138 over the PCI-bus 113. System controller 116 negates TRDY#, and so on for the remainder of the burst.

The last Dword in the cache line-sized block of DRAM 28, Dword 1C, is transferred to the PCI device 138 on the rising edge of PCICLK which begins PCICLK cycle 54/55. Note, however, that no delay is incurred before the transfer of Dword 20, which is the first Dword of the next cache line address. In fact, in the situation illustrated in FIG. 4, all of the data transfers in the burst take place at a constant rate, specifically one Dword in every two PCICLK cycles, even as the burst continues beyond the cache line boundary. This is a consequence of the features of the present embodiment of the invention.

In order to minimize or eliminate delays at cache line boundaries, as previously described, the system controller 116 performs a predictive snoop ("pre-snoop") of the second cache line address of the burst, prior to completion of the last PCI-bus data transfer from the initial cache line address of the burst. In fact, because the system controller 116 controls the DRAM address on MA(11:0) independently from addresses which the system controller 116 places on the host bus 112 HA(31:5) lines, the pre-snoop takes place simultaneously with at least one data transfer taking place on the PCI-bus 118. The predictive snoop is "predictive" because it is performed even though the system controller 116 does not yet know whether the PCI device 138 desires to continue the burst beyond the cache line boundary.

In order to accomplish pre-snoop, the system controller 116 detects the first PCI-bus data transfer by sampling IRDY# and TRDY# asserted at the beginning of PCICLK cycle 26/27. It then increments the cache line address on HA(31:5) at the beginning of PCICLK cycle 28/29, to refer to the next sequential cache line address (line address 20). System controller 116 then, in HCLK cycle 32, asserts EADS# to initiate an inquire cycle of the L1 cache 212 in the host processing subsystem 110. Two HCLK cycles later, at the beginning of HCLK cycle 35, the system controller 116 samples HITM# negated. Thus, the inquiry cycle for the second cache line has been completed before the last data transfer takes place in the first cache line. Assuming the first transfer does in fact proceed beyond the cache line boundary, the first data transfer (Dword 20) of the second line of data can take place without stopping the burst and without inserting any additional PCI-bus wait states (see arrow 442).

In anticipation of the burst continuing beyond yet another cache line boundary, the system controller 116 then performs a predictive snoop for the third cache line of the burst, again, while data is still being transferred from secondary memory addresses in the second cache line. Specifically, at the beginning of PCICLK cycle 58–59, the system controller 116 samples both IRDY# and TRDY# asserted. It increments the line address to the host processing subsystem 110 in HCLK cycle 60, and asserts EADS# in HCLK cycle 64. HITM# is again sampled negated at the beginning of HCLK cycle 66, and once again the L1 cache inquiry cycle has been completed before the PCI-bus data transfers have reached the cache line boundary. The process continues until the PCI device 138 terminates the burst, or the inquiry cycle results in HITM# asserted. The latter situation is described below with respect to FIG. 6.

B. Starting Quad Word 00 HITM# On Initial Cache Snoop

Figure 5:
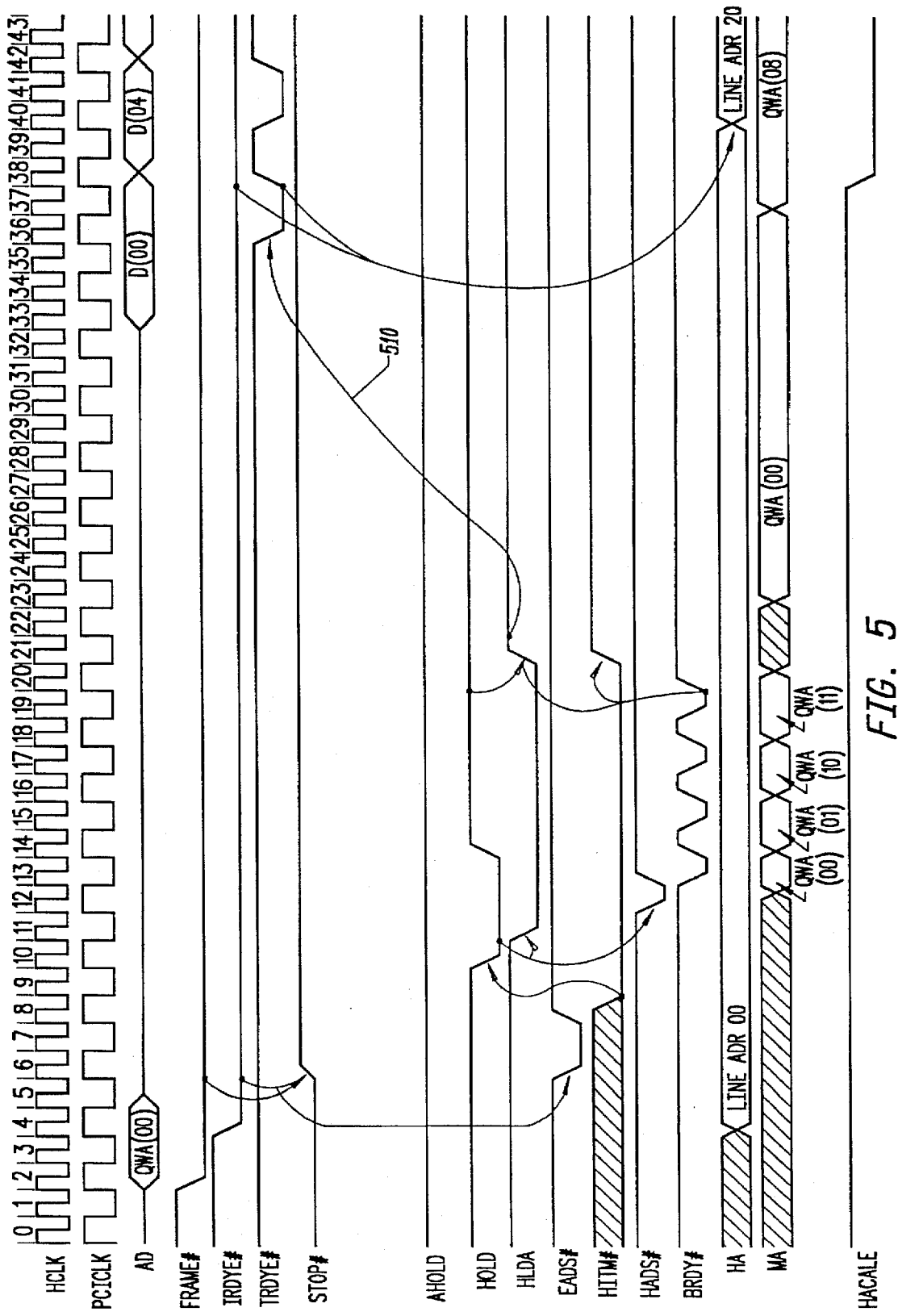

FIG. 5 illustrates the operation of the system of FIG. 1 for a PCI-bus master-initiated burst read transfer beginning at a cache line boundary, as in FIG. 4, but where the first inquiry cycle discovers that the desired line of secondary memory address space is cached modified in the L1 cache 212 in the host processing subsystem 110. Referring to FIG. 5, the PCI-bus master 138 asserts a command and address on the PCI-bus 118 in PCICLK cycle 2/3, and asserts FRAME#. In PCICLK cycle 4/5, it asserts IRDY#. The line address of a desired data is translated on to the host address bus HA(31:5) and, when the system controller 116 samples FRAME# and IRDY# both asserted at the beginning of PCICLK cycle 6/7, it asserts EADS# to begin an inquiry cycle of the host processing subsystem 110.

On the rising edge that begins HCLK cycle 9, the system controller 116 samples HITM# asserted, indicating a cached modified condition. The system controller 116 does not terminate the PCI-bus transfer, but rather, withholds TRDY# and, in HCLK cycle 10, negates HOLD to the host processing subsystem 110. The host processing subsystem 110 then negates HLDA in HCLK cycle 11 and prepares to perform a write-back cycle. The host processing subsystem 110 asserts HADS# in HCLK cycle 12, for one HCLK cycle, and performs a burst write of the L1 cache data to secondary memory 126. BRDY# is asserted four times during the write-back cycle, thereby allowing the full 32-byte line to be written to secondary memory.

In HCLK cycle 14, the cycle after the host processing subsystem 110 negates HADS#, the system controller 116 reasserts HOLD in order to retrieve the host bus 112 after the write back cycle. The host processing subsystem 110 recognizes this on the fourth BRDY#, i.e., the beginning of HCLK cycle 20. The host processing subsystem thereafter releases the host bus 112 and asserts HLDA. The host processing subsystem 110 also negates HITM# at the beginning of HCLK cycle 22, indicating that the line in secondary memory 126 and the line in L1 cache 212 are now consistent. The system controller 116 then provides the first quad word address to DRAM 128 via MA(11:0). The data in the low order Dword output by the DRAM 128 (Dword 00) soon reaches the AD(31:0) lines of the PCI-bus 118, and after a synchronization delay indicated by arrow 510, the system controller 116 asserts TRDY# in PCICLK cycle 36/37 to allow the first data transfer on the PCI-bus 118 to take place. The remainder of the process is the same as that shown in FIG. 4, beginning at HCLK cycle 24 of FIG. 4.

C. During Burst Transfer, Snoop of Next Cache Line Produces HITM# Asserted.

Figure 6:
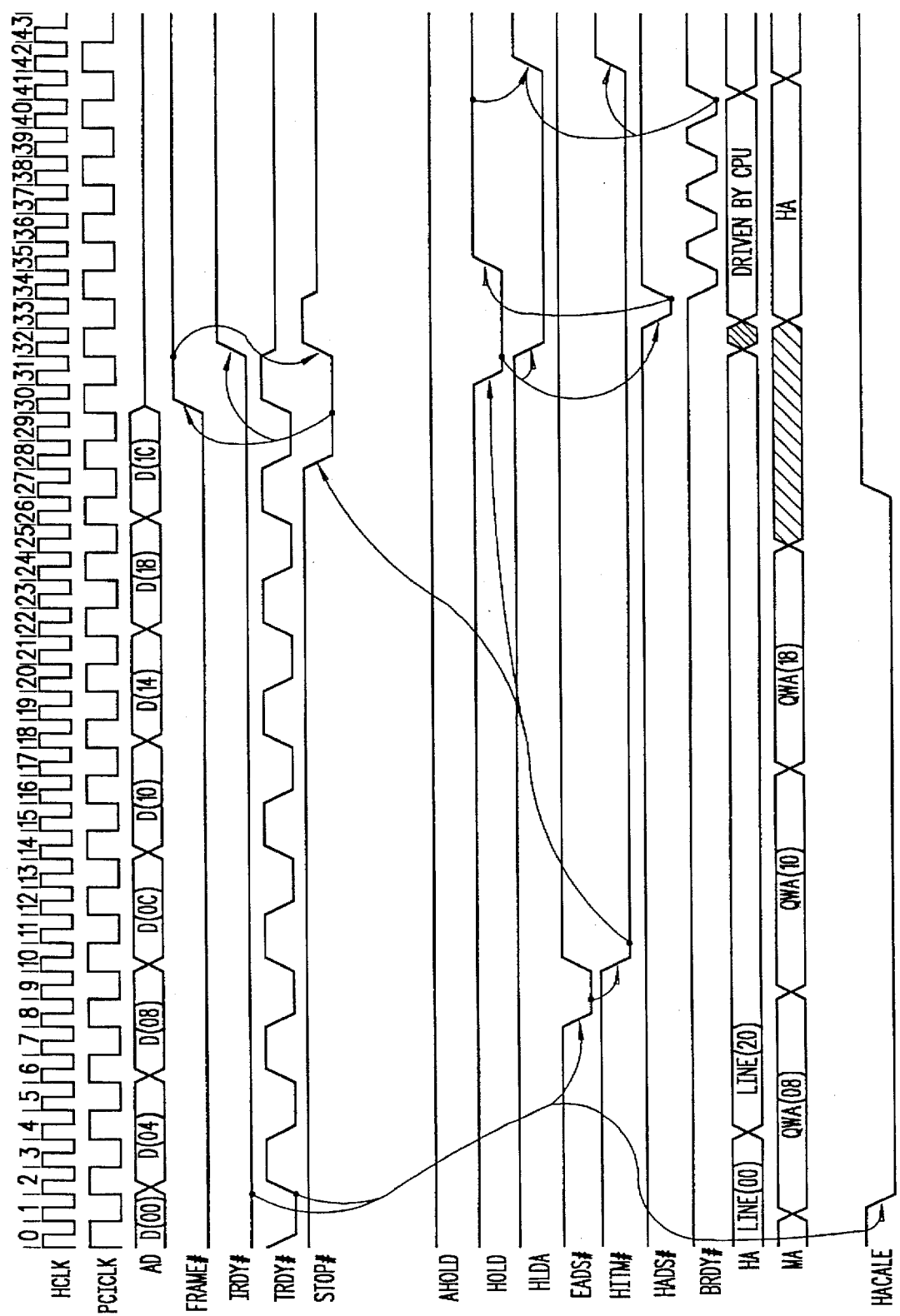

FIG. 6 is a timing diagram illustrating the operation of the system of FIG. 1, during a burst transfer from the secondary memory 126 to the PCI device 138, in which the predictive snoop produces HITM# asserted. In HCLK cycle 0 in FIG. 6, MA(11:0) still carries the quad word address for the first quad word in the current line of secondary memory address space being transferred. The line address of the current line is still present in HA(31:5), and the first Dword (D(00)) is presently being translated by the system controller 116 onto AD(31:0). FRAME# and IRDY# are being driven asserted by the PCI device 138, and STOP# is being driven negated by the system controller 116. In addition, system controller 116 is asserting HOLD to the host processing subsystem 110, which is returning HLDA asserted to the system controller 116. EADS#, HITM#, HADS# and BRDY# are all negated.

In PCICLK cycle 0/1, the system controller 116 asserts TRDY#. MA(11:0) shortly thereafter changes to the second quad word address of the current line of secondary memory (QWA(08)). On the rising edge which begins PCICLK cycle 2/3, D(00) is transferred to the PCI device 138 and D(04) is driven onto the PCI-bus 118 AD lines. The full eight Dwords of the current secondary memory line are transferred in the manner previously described with respect to FIG. 4 (assuming the PCI device 138 does not negate FRAME# to terminate the burst early).

In about PCICLK cycle 4/5, the system controller 116 begins driving the second line address, predictively, onto the host bus 112 HA(31:5) address lines. In HCLK cycle 8, the system controller 116 asserts EADS# for two HCLK cycles. It is now assumed that the new line of data is cached modified in the L1 cache 212 in the host processing subsystem 110, so in HCLK cycle 10, the host processing subsystem 110 asserts HITM#. The system controller 116 detects HITM# asserted as early as the beginning of HCLK cycle 11 or 12, but it does not stop the PCI burst cycle at this time in order to allow a write back to take place. If the burst were to be stopped at this time, then two new inquiry cycles would be performed when the PCI master restarts the burst: once for the current line of secondary memory (line (00)), and again for the second line of secondary memory (line (20)). By waiting until the entire first cache line has been transferred before stopping the burst, the system controller 116 avoids any need for the first of these two inquiry cycles when the PCI master restarts after write back. Note that in another embodiment, if the predictive snoop finds the next line cached modified, the system controller can allow the write-back to proceed at the same time that data continues to be transferred to the PCI device 138 from the current line of secondary memory. This might be accomplished, for example, by reading the entire line into a buffer and transferring it to the PCI master at the same time that the write-back is proceeding to memory.

Accordingly, in response to HITM# sampled asserted in PCICLK cycle 11/12, the system controller 116 asserts STOP# to the PCI device 138 during the last PCI-bus transfer of a Dword in the first line of secondary memory. Thus, the PCI device 138 samples STOP# asserted at the beginning of PCICLK cycle 30/31, the same time that it samples TRDY# asserted for such final Dword transfer. In response, the PCI device 138 negates FRAME# in PCICLK cycle 30/31, and negates IRDY# in PCICLK cycle 32/33. The PCI-bus 118 burst transfer is effectively terminated at this point, and if the PCI device 138 requires further data transfer, it will subsequently arbitrate for the PCI-bus 118 again, assert FRAME# and IRDY#, and so on to essentially restart the burst at the beginning of the next cache line.

Also in response to HITM# asserted, the system controller 116 negates HOLD in HCLK cycle 31 in order to allow the write-back cycle to take place. At the beginning of HCLK cycle 32, the host processing subsystem 110 samples HOLD negated and negates HLDA in response thereto. In HCLK cycle 33, the host processing subsystem 110 asserts HADS#, and the write-back cycle consisting of four BRDY#'s takes place. The system controller 116 samples HADS# asserted at the beginning of HCLK cycle 34, and if the PCI device or another device desires control of the host bus 112, the system controller 116 can reassert HOLD as early as HCLK cycle 35 in order to reclaim the host bus 112 as soon as the write back is complete. Thus the write back cycle has taken place, the system controller 116 is master on the host bus 112, and the PCI-bus master device 138 can restart its burst transfer at the beginning of the next secondary memory line.

D. Burst Transfer To Begin With Last Data Unit Of A Line

As can be seen from the timing diagram of FIG. 4, an inquiry cycle at the beginning of a burst transfer imposes a significant delay even if the specified secondary memory line is either not in the L1 cache or is not modified in such cache. In FIG. 4, for example, this delay is represented by the time between FRAME# and IRDY# sampled asserted at the begining of PCICLK cycle 6/7, and assertion of TRDY# in PCICLK cycle 24/25. Because of this delay, the system controller 116 does not perform a predictive snoop if the starting address of the burst transfer is the last data unit in a line of secondary memory. That is, if the low-order five bits of the PCI master's starting byte address are 1C, then the predictive snoop is omitted. Instead, after an inquiry cycle is performed on the line address for the first Dword of the burst, resulting either in HITM# negated or in a write-back cycle followed by HITM# negated, the system controller 116 allows only one data transfer to take place before stopping the transaction. It stops the transaction by asserting STOP# to the PCI device 138 in conjunction with the first data transfer. The PCI master 138 will negate FRAME#, and subsequently IRDY#. After re-arbitration, it can then start a new burst transfer using the waveforms illustrated in FIG. 4 (if the next line address is not cached modified in the L1 cache 212) or FIG. 5 (if the next line address is cached modified in the L1 cache 212).

E. Starting Address 18, Neither Line Cached Modified

If the starting address of the burst is the second-to-last data unit of a line of secondary memory (18 in low-order five bits of byte address), then the system controller 116 does predictively snoop the next line because some advantage can be obtained, even though the advantage is not as great as in situations where the starting byte address ends in 14 or less.

Figure 7:
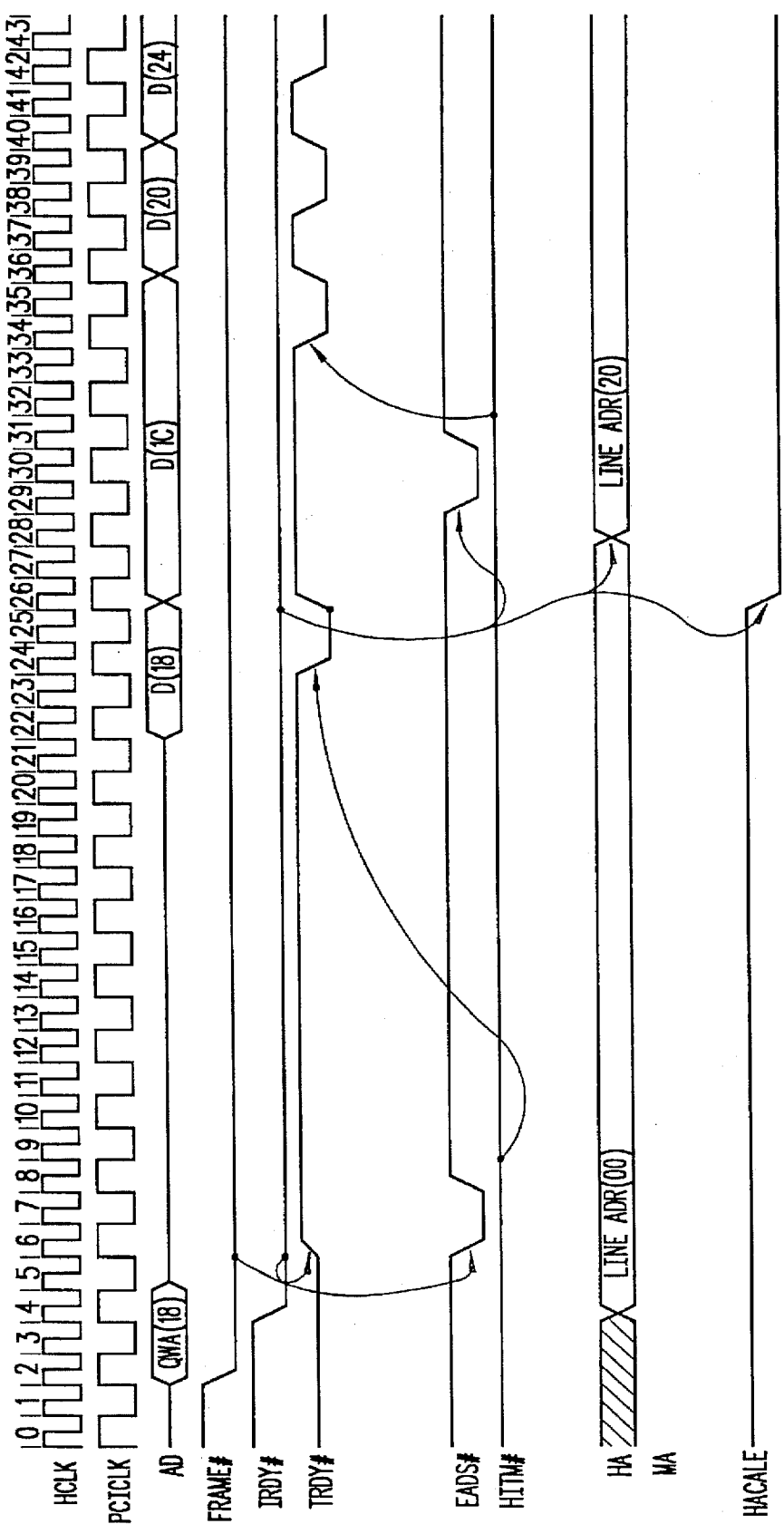

FIG. 7 illustrates the operation of the system of FIG. 1 in this situation.

Referring to FIG. 7, in PCICLK cycle 2/3, the PCI device 138 drives the quad word address QWA(18) of the first desired transfer of the burst, onto the PCI-bus 118 AD lines. It asserts FRAME# in PCICLK cycle 2/3 and asserts IRDY# in PCICLK cycle 4/5. The system controller 116 translates the line address portion of the starting quad word address, specifically line address (00), onto the host bus 112 address lines HA(31:5) in HCLK cycle 4. In response to FRAME# and IRDY# asserted at the beginning of HCLK cycle 6, system controller 116 asserts EADS# in HCLK cycle 6 to initiate an inquiry cycle. The system controller 1116 samples HITM# negated at the beginning of HCLK cycle 9, and in response thereto, after synchronization, asserts TRDY# to the PCI device 138 in PCICLK cycle 24/25. By this time, the first Dword of the transfer, D(18), is present on the PCI-bus 118 AD(31:0) lines. D(18) is transferred on the rising edge which begins PCICLK cycle 26/27. The transfer of dword D(1C) is delayed somewhat, however, because a determination must first be made as to whether to simultaneously assert STOP#. (If STOP# is to be asserted, it must be asserted simultaneously with the final TRDY#.)

In response to IRDY# and TRDY# both sampled asserted at the beginning of PCICLK cycle 26/27, the system controller 116 drives the next line address, line address 20, onto HA(31:5). Also in PCICLK cycle 26/27, HACALE is asserted. Further, in HCLK cycle 29, the system controller 116 asserts EADS# to the host processing subsystem 110 in order to initiate the next line L1 cache inquiry. As in the illustration of FIG. 6, should HITM# be returned asserted, the system controller 116 would stop the burst on the PCI-bus 118 at this time and allow a write-back to take place. In the illustration of FIG. 7, however, HITM# is sampled negated at the beginning of HCLK cycle 32. In response thereto, the system controller 116 asserts TRDY# in PCICLK cycle 34/35 and the last data unit D(1C) is transferred without a simultaneous assertion of STOP#. TRDY# is again asserted in PCICLK cycle 38/39, and the first data unit (D(20)) of the next secondary memory line (line address (20)) is transferred on the PCICLK rising edge which begins cycle 40/41. Data units then continue to be transferred in the manner described above with respect to FIGS. 4 and 6, until the burst is terminated either by the PCI device 138 on its own initiative, or by the system controller 116 in response to HITM# sampled asserted. It can be seen that although some delay is incurred at the secondary memory line boundary (note the delay in FIG. 7 between the second and third assertions of TRDY#), this delay is significantly shorter than the delay which is incurred by the conventional technique of automatically stopping the burst at the cache line boundary, forcing the PCI device to re-arbitrate for the PCI-bus 118, perform a new PCI-bus address phase, and wait for a new snoop cycle to take place for the new line address.

F. L2 Cache Hit Conditions

In all of the above illustrations, it was assumed that none of the data being transferred was present in the L2 cache 130 (FIG. 1). Because of this, all data in the PCI bursts were transferred with the DRAM 128. However, a problem occurs if there is an L2 cache hit condition for one of the transfers. The problem occurs because the L2 cache 130 receives the line address from the host bus 112 address lines HA(31:5), and the predictive snoop features of the present embodiment change HA(31:5) beginning in about the second Dword transfer from each secondary memory line. The second Dword transfer is usually part of only the first quad word accessed in the L2 cache 130, and up to three more quad words may follow. With the changed HA(31:5), however, such subsequent quad words would be read from the wrong location in the L2 cache 130.

The system of FIG. 1 solves this problem through the use of a latch 132 coupled between HA(31:5) and the A (31:5) lines of the address port of the L2 cache 130. The latch 132 is enabled by HACALE, driven by the system controller 116 (latch 132 is transparent when HACALE=1, and is latched when HACALE=0). As can be seen in each of FIGS. 4, 5, 6 and 7, the system controller 116 negates HACALE before it changes the line address on HA(31:5) and reasserts HACALE after the last quad word of the current L2 cache line has been transmitted to the system controller 116. HACALE opens latch 132 while the system controller 116 is still driving the next line address onto HA(31:5), and again closes the latch before it begins driving the third line address onto HA(31:5) for the next predictive snoop cycle.

Table I below summarizes the cycles that take place with respect to the L1 cache, L2 cache and DRAM for all combinations of hit, miss and hit-modified on PCI master read accesses. Table II summarizes the same for all PCI master write accesses. As used in the tables, "hitM" indicates a cached modified condition in the L1 cache.

cache does support inquire cycles, the system controller 116 can perform the L1 and L2 inquire cycles concurrently. If either of the caches indicate a cached modified condition, the system controller 116 can delay or stop the burst as previ-

TABLE I

DMA/Master Read Cycle Summary

| DMA/Master Read Cycle | | | | | |
|---|---|---|---|---|---|
| L1 Cache | L2 Cache | Data Source | Type of Cycle for L1 Cache | Type of Cycle for L2 Cache | Type of Cycle for DRAM |
| Hit | Hit | L2 Cache | No Change | Read the Bytes Requested | No Change |
| hitM | Hit | L1 Cache | Castout | Write CPU Data, Read Back the Bytes Requested | No Change |
| Hit | Miss | DRAM | No Change | No Change | Read the Bytes Requested |
| hitM | Miss | L1 Cache | Castout | No Change | Write CPU Data, Read Back the Bytes Requested |
| Miss | Hit | L2 Cache | No Change | Read the Bytes Requested | No Change |
| Miss | Miss | DRAM | No Change | No Change | Read |

TABLE II

DMA/Master Write Cycle Summary

| DMA/Master Write Cycle | | | | | |
|---|---|---|---|---|---|
| L1 Cache | L2 Cache | Data Destination | Type of Cycle for L1 Cache | Type of Cycle for L2 Cache | Type of Cycle for DRAM |
| Hit | Hit | DRAM, L2 Cache | Invalidate | Write Master Data | Write Master Data |
| hitM | Hit | DRAM, L2 Cache | Castout, Invalidate | Write CPU Data, Write Master Data | Write CPU Data, Write Master Data |
| Hit | Miss | DRAM | Invalidate | No Change | Write Master Data |
| hitM | Miss | DRAM | Castout, Invalidate | No Change | Write CPU Data, Write Master Data |
| Miss | Hit | DRAM, L2 Cache | No Change | Write Master Data | Write Master Data |
| Miss | Miss | DRAM | No Change | No Change | Write Master Data |

G. Synchronous SRAM L2 Cache

In all of the above illustrations, the L2 Cache 130 uses asynchronous SRAMs. The system controller 116 also permits synchronous SRAMs to be used in the L2 cache 130, and the host processing subsystem 110 programs a register in the system controller 116 during boot-up to indicate which type of SRAM is present.

Synchronous SRAMs differ from asynchronous SRAMs in the L2 cache 130 in that the quad words which are read or written to a line of L2 cache memory are not guaranteed to lie at linearly incrementing quad word addresses unless the first quad word accessed is the first quad word of the cache line. However, in a given embodiment, predictive snoops can still be performed.

H. Inquire Cycles for L2 Cache

In the system of FIG. 1, the L2 cache 130 does not support inquire cycles. In another embodiment, in which the L2 ously described, and allow a write-back to take place from the appropriate cache.

III. IMPLEMENTATION

FIGS. 8–12 are schematic diagrams of pertinent portions of the system controller 116 which control various signals used for implementing the invention. While all the descriptions above are sufficient to enable implementation of the invention, descriptions at the schematic level for some aspects are provided for those interested in more details about an example implementation. It will be understood that many other implementations are possible, all within the ordinary skill of a designer.

A. Circuitry to Generate EADS#

Figure 8:
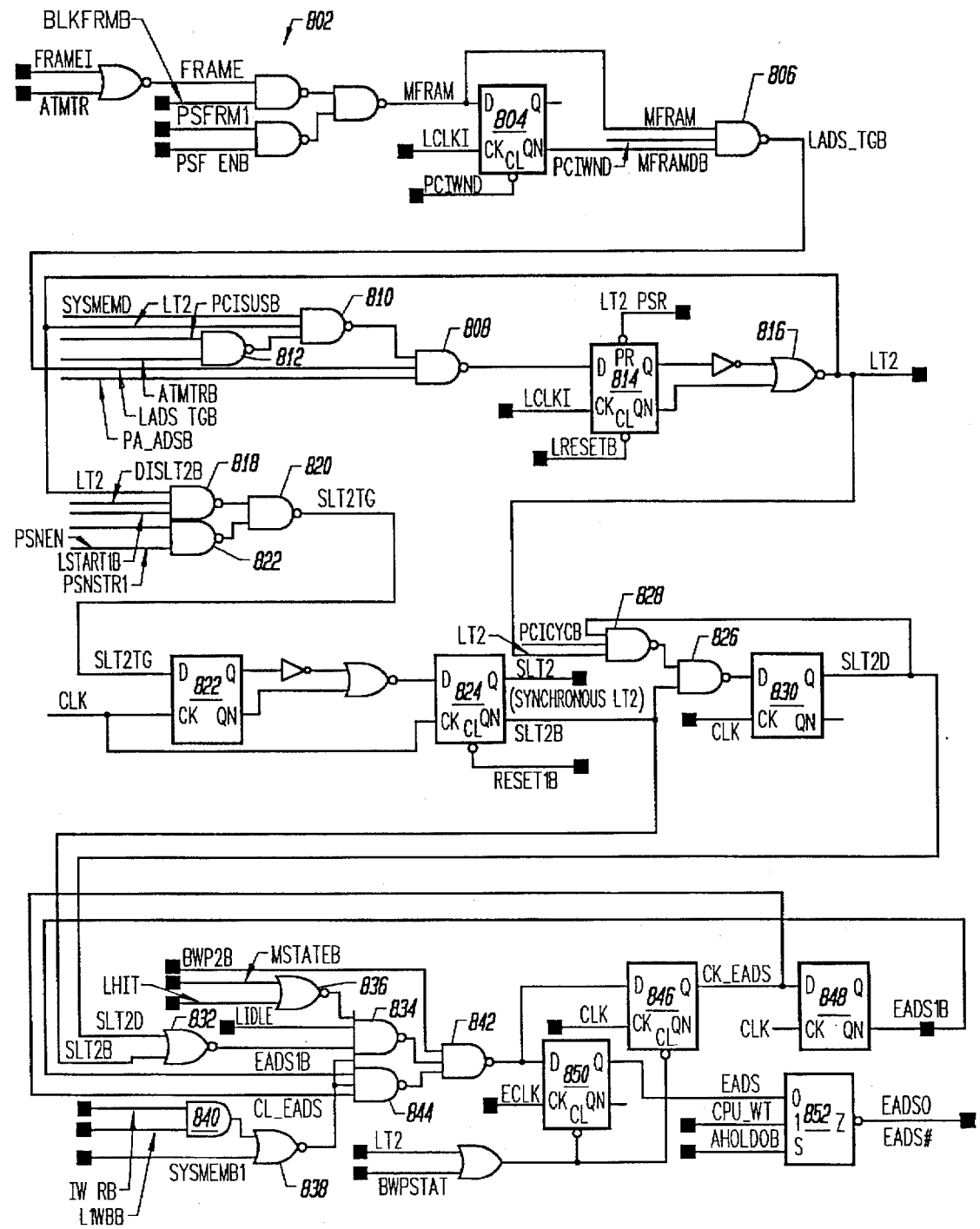
FIGS. 8–12 are schematic diagrams of circuitry in the system controller of FIG. 1.

FIG. 8 is a schematic diagram of pertinent circuitry which produces the EADS# signal output to the host processing subsystem 110 (FIG. 1). As shown in FIG. 8, the PCI-bus FRAME# signal reaches the circuitry of FIG. 8 as FRAMEI. In the nomenclature of FIGS. 8–12, signals named with a designation ending in "I" or "O" indicate input and output signals, and are asserted with the same polarity as the corresponding external signals (i.e., low if the corresponding external signal names end in "#" or B and high if they do not). FRAMEI passes through some logic circuitry 802 where it is qualified by certain other signals, the purpose of which is not pertinent to an understanding of the invention. Essentially, in all cases pertinent to the invention, the output of logic circuitry 802, MFRAM, is asserted high whenever FRAME# is asserted low on the PCI-bus 118.

MFRAM is provided to the D input of a D flip-flop 804, which is clocked by an LCLKI signal (equivalent to the PCI-bus PCICLK signal). The QN output of flip-flop 804, MFRAMDB, is connected to one input of a three-input NAND gate 806, a second input of which is connected to receive MFRAM. The third input of NAND gate 806 receives a PCIWND signal which, for purposes of the present description, can be assumed to remain at a high logic level. Accordingly, it can be seen that the output of NAND gate 806, designated LADS_TGB ("local ADS trigger") will carry a low-going, one PCICLK-clock-width pulse, in response to the PCI device's assertion of FRAME#.

LADS_TGB is provided to one input of a three-input NAND gate 808. Another input of the NAND gate 808 is connected to the output of three-input NAND gate 810. NAND gate 810 has one input which receives an SYS-MEMD signal, indicating whether the address provided by the PCI master is within the address space of secondary memory 126. If not, then SYSMEMD remains low and the output of NAND gate 810 remains high. A second input of NAND gate 810 receives an LT2 ("local T2" signal), described below. The third input of NAND gate 810 is connected to the output of another NAND gate 812, which can be assumed to remain high at all times pertinent to the invention. Similarly, the third input of NAND gate 808 receives a PA_ADSB signal, which can also be assumed to remain high at all times pertinent to the invention.

The output of NAND gate 808 is connected to the D input of a D flip-flop 814, which is clocked by the PCICLK signal LCLKI. The QN output of flip-flop 814 is NORed with an inverted version of the Q output of flip-flop 814, in NOR gate 816, to produce the LT2 signal which is provided to an input of NAND gate 810 as described above. Accordingly, it can be seen that as long as the address provided by the PCI master 138 is within the secondary memory 126 address space, LT2 will carry a one-PCICLK-cycle-wide high-going pulse in the second PCICLK cycle following the cycle in which FRAME# was asserted by the PCI master 138 (e.g., PCICLK cycle 4/5 in FIG. 4).

LT2 is connected to one input of a three-input NAND gate 818. The second input of NAND gate 818 receives DISLT2B, which can be assumed to remain high, and an LSTART1B signal, which is high as long as the system controller 116 is not yet certain that the data in secondary memory 126 at the secondary memory line address specified by the PCI master 138 is the latest copy of the data. That is, LSTART1B goes low after the host processing subsystem 110 brings HITM# high, either immediately after EADS# or following an L1 cache write-back cycle.

The output of NAND gate 818 is connected to one input of a two-input NAND gate 820, the other input of which is connected to the output of a two-input NAND gate 822. One input of NAND gate 822 is connected to receive a PSNEN signal, which enables the pre-snoop feature and can be assumed to be high throughout, and the other input is connected to receive a PSNSTR1 signal. The latter signal is used during predictive snoop operations, which take place later in the burst (see PCICLK cycle 32/33 in FIG. 4, e.g.). At the initial assertion of FRAME#, PSNSTR1 remains low. As described below, PSNSTR1 will carry a high-going pulse when it is desired to assert EADS# for predictive snoop cycle later in the burst. Accordingly, as can be seen, the output of NAND gate 820, designated SLT2TG ("synchronous local T2 trigger") carries a high-going, one PCICLK-cycle-wide pulse, in the PCICLK cycle following that in which FRAME# was asserted. SLT2TG will also carry a one PCICLK-cycle-wide high-going pulse at the time a predictive snoop cycle is to take place.

The SLT2TG signal is connected to the D input of a D flip-flop 822, which is clocked by a clock signal CLK (equivalent to HCLK in FIGS. 4–7). The QN output of flip-flop 822 is NORed with an inverted version of the Q output of flip-flop 822 and the result applied to the D input of another D flip-flop 824, also clocked by CLK. It can be seen that the flip-flops 822 and 824 act as a synchronizer for synchronizing the pulse on SLT2TG with the host bus clock signal HCLK. Thus the QN output of flip-flop 824, labeled SLT2B, carries a low-going pulse whenever an inquiry cycle is desired. The low-going pulse begins and ends synchronously with HCLK, but depending on several factors including the relationship between the PCICLK and HCLK, may be one or more HCLK cycles wide.

SLT2B is connected to one input of a NAND gate 826, the other input of which is connected to the output of a three-input NAND gate 828. One input of NAND gate 828 receives the LT2 signal output of NOR gate 816. A second input of NAND gate 828 receives a PCICYCB signal, which can be assumed to remain high at all times pertinent to the invention. The output of NAND gate 826 is connected to the D input of a flip-flop 830, which is clocked by CLK. The Q output of flip-flop 830, designated SLT2D, is fed back to the third input of NAND gate 828. It can be seen that SLT2D will carry a high-going pulse that begins in the HCLK cycle following that in which the low-going pulse on SLT2B began, and the SLT2D pulse will last for at least as many HCLK cycles as SLT2B lasted. Additionally, if needed, the NAND gates 828 and 826 will stretch the SLT2D pulse until after the end of the LT2 pulse. That is, NAND gates 828 and 826 ensure that the SLT2D pulse will extend beyond the end of PCICLK cycle 4/5 (FIG. 4).

SLT2B and SLT2D are NORed in NOR gate 832, producing a high-going pulse during the overlap between the SLT2B pulse and the SLT2D pulse. The output of NOR gate 832 is connected to one input of a four-input NAND gate 834. A second input of NAND gate 834 is connected to an LIDLE signal, which prevents EADS# from recurring at inappropriate times. LIDLE is high at this time. A third input of NAND gate 834 is connected to the output of a NOR gate 836, which can be assumed to remain high at all times pertinent to the invention. The fourth input of NAND gate 834 is connected to the output of a NOR gate 838, one input of which receives SYSMEMB1. The other input of NOR gate 838 is connected to the output of an AND gate 840, which can be assumed to be low at all times pertinent to the invention. SYSMEMB1 is low if the secondary memory address provided by the PCI master 138 is within the secondary memory 126 address space, and is high if not. Thus, as long as the PCI device 138 addresses an address within the secondary memory address space, the output of NOR gate 838 will be high.

The output of NAND gate 834 is connected to one input of a three-input NAND gate 842, a second input of which is connected to receive a BWP2B signal, which can be assumed to remain high. The third input of NAND gate 842 is connected to the output of another three-input NAND gate 844. One input of NAND gate 844 is connected to the output of NOR gate 838, previously described, and the other two inputs of NAND gate 844 receive an EADS1B signal and a CK_EADS signal, respectively, both described below.

The output of NAND gate 842 is connected to the D input of a D flip-flop 846, clocked by the CLK signal to produce a Q output designated CK_EADS. CK_EADS is connected to the D input of another flip-flop 848, clocked by CLK, to produce on its QN output the EADS1B signal. CK_EADS and EADS1B are fed back to the two inputs of NAND gate 844 as previously stated. It can be seen that because of this feedback, the output of NAND gate 842 will carry a high-going pulse which is the width of two HCLK cycles.

The output of NAND gate 842 is connected to the D input of another D flip-flop 850, which is clocked by an ECLK signal. ECLK ("early clock") is equivalent to HCLK, except that it operates a few nanoseconds earlier. The Q output of flip-flop 850 is connected to the '0' input of an inverting multiplexer 852, the output of which carries an EADSO signal for the EADS# output of system controller 116. The '1' input of multiplexer 852 receives a CPU_WT signal, and the select input receives an AHOLDOB signal. AHOLDOB is low at all pertinent times, so EADS# carries the output of flip-flop 850.

Accordingly, it can be seen that the circuitry of FIG. 8 produces a low-going, two HCLK-cycle-wide pulse, in about the fourth HCLK cycle following assertion of FRAME# by the PCI device 138.

Figure 9:
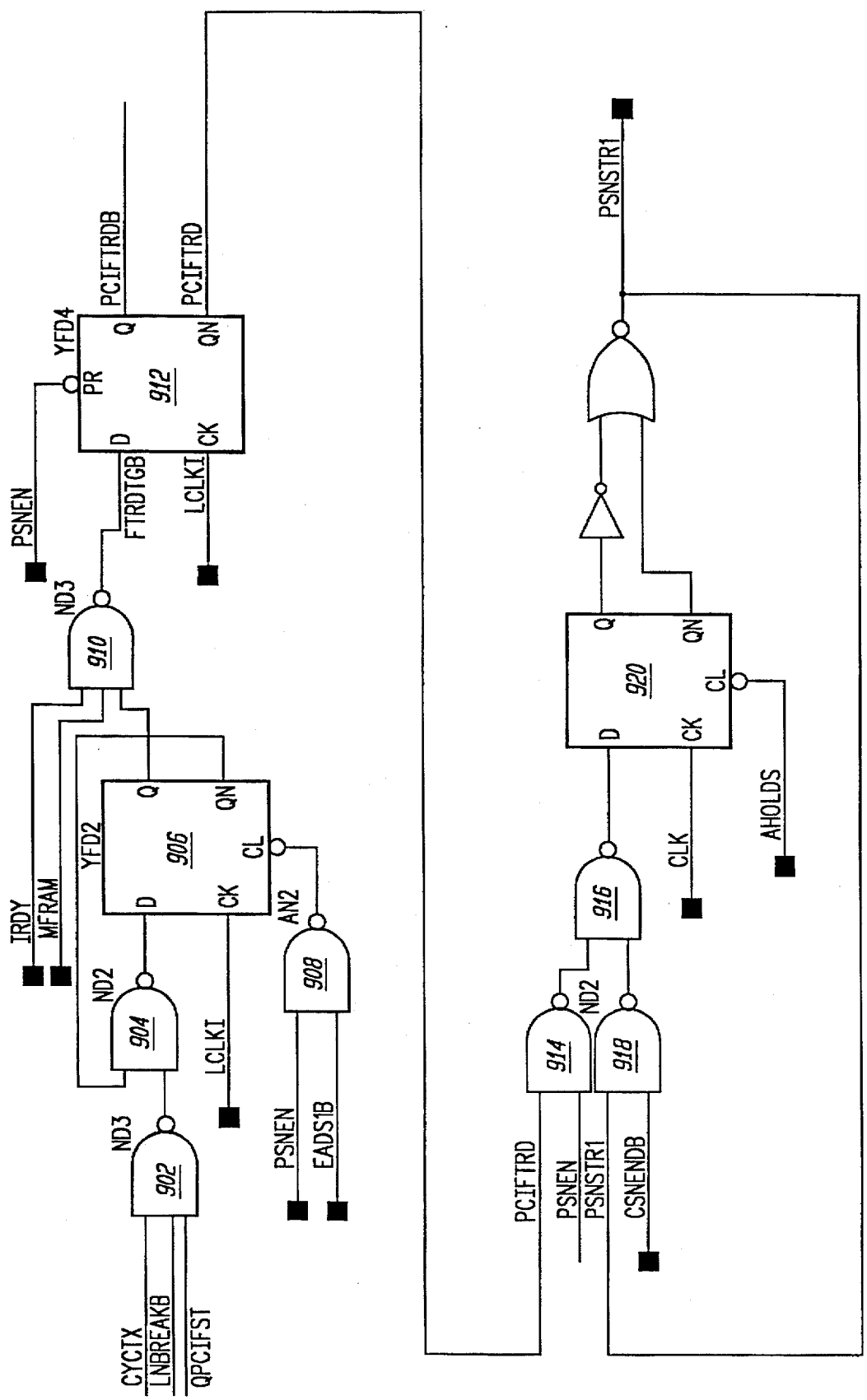

FIG. 9 is a schematic diagram of circuitry in the system controller 116 which produces the PSNSTR1 signal used in FIG. 8. As previously mentioned, PSNSTR1 carries a high-going pulse when it is desired to initiate a predictive snoop cycle during a PCI master burst transfer.

Referring to FIG. 9, a three-input NAND gate 902 receives a QPCIFST signal, which is high during the first transfer of a PCI burst or the beginning of a new cache line transfer.

Another input of NAND gate 902 receives a CYCTX signal, which is asserted when both IRDY# and TRDY# are sampled active (a transfer is occurring). NAND gate 902 also receives an LNBREAKB signal, which is low only if the data unit then being transferred is the highest data unit in a cache line. Accordingly, the output of NAND gate 902 will go low during the transfer of the first data unit to be transferred from a line of secondary cache, but not if the transfer is beginning with the highest data unit in the line of secondary memory. This is consistent with the discussion above with respect to FIG. 6 in which predictive snoop is omitted in this situation.

The output of NAND gate 902 is connected to one input of a two-input NAND gate 904, the output of which is connected to the D input of a flip-flop 906. The QN output of flip-flop 906 is connected back to the second input of NAND gate 904. The flip-flop 906 has an inverting clear input which is connected to the output of an AND gate 908, one input of which receives PSNEN, which remains high at all times pertinent herein, and the other input of which receives an EADS1B signal. EADS1B goes low after EADS#, thereby clearing flip-flop 906. Accordingly, flip-flop 906 latches the output of NAND gate 902 until after EADS# has been asserted.

The Q output of flip-flop 906 is inverted and qualified, in three-input NAND gate 910, by IRDY and MFRAME. IRDY is the inverse of the PCI-bus 118 IRDY# signal, and as previously explained, MFRAME essentially follows the inverse of the PCI-bus FRAME# signal. Thus, NAND gate 910 blocks the output of flip-flop 906 if the PCI device 138 has already indicated that the present transfer is to be the last transfer of the burst. Otherwise, the output of NAND gate 910 (called FTRDTGB ("first TRDY# trigger")) carries a one PCICLK-wide low-going pulse, beginning with the PCICLK rising edge that ends the first PCI transfer of the current line of secondary memory.

The output of NAND gate 910, FTRDTGB, is connected to the D input of a flip-flop 912, which is clocked on LCLKI. Flip-flop 912 thus delays FTRDTGB by one PCICLK to enable other circuitry (not shown) in the system controller 116 to increment the secondary memory line address on HA(31:5) (FIG. 1).

The QN output of flip-flop 912, designated PCIFTRD, is connected to one input of a two-input NAND gate 914, the other input of which receives PSNEN. The output of NAND gate 914 is connected to one input of a two-input NOR gate 916, the other input of which receives the output of another NAND gate 918. One input of NAND gate 918 receives a CSNENDB signal, which is high until EADS# is asserted, and the other input of NAND gate 918 receives the PSN-STR1 signal. The output of NAND gate 916 is connected to the D input of a flip-flop 920 which is clocked by CLK (equivalent to the host bus clock signal HCLK). The QN output is NORed with an inverted version of the Q output of flip-flop 920 to produce the PSNSTR1 signal, which is fed back to NAND gate 918. PSNSTR1 therefor carries a high-going pulse which is synchronized with the host bus clock signal HCLK#, and which remains high until EADS# is asserted.

As previously described, PSNSTR1 is provided to an input of NAND gate 822 in FIG. 8 and, like LT2, initiates an L1 cache inquiry cycle.

B. Circuitry to Generate STOP#

Figure 10:
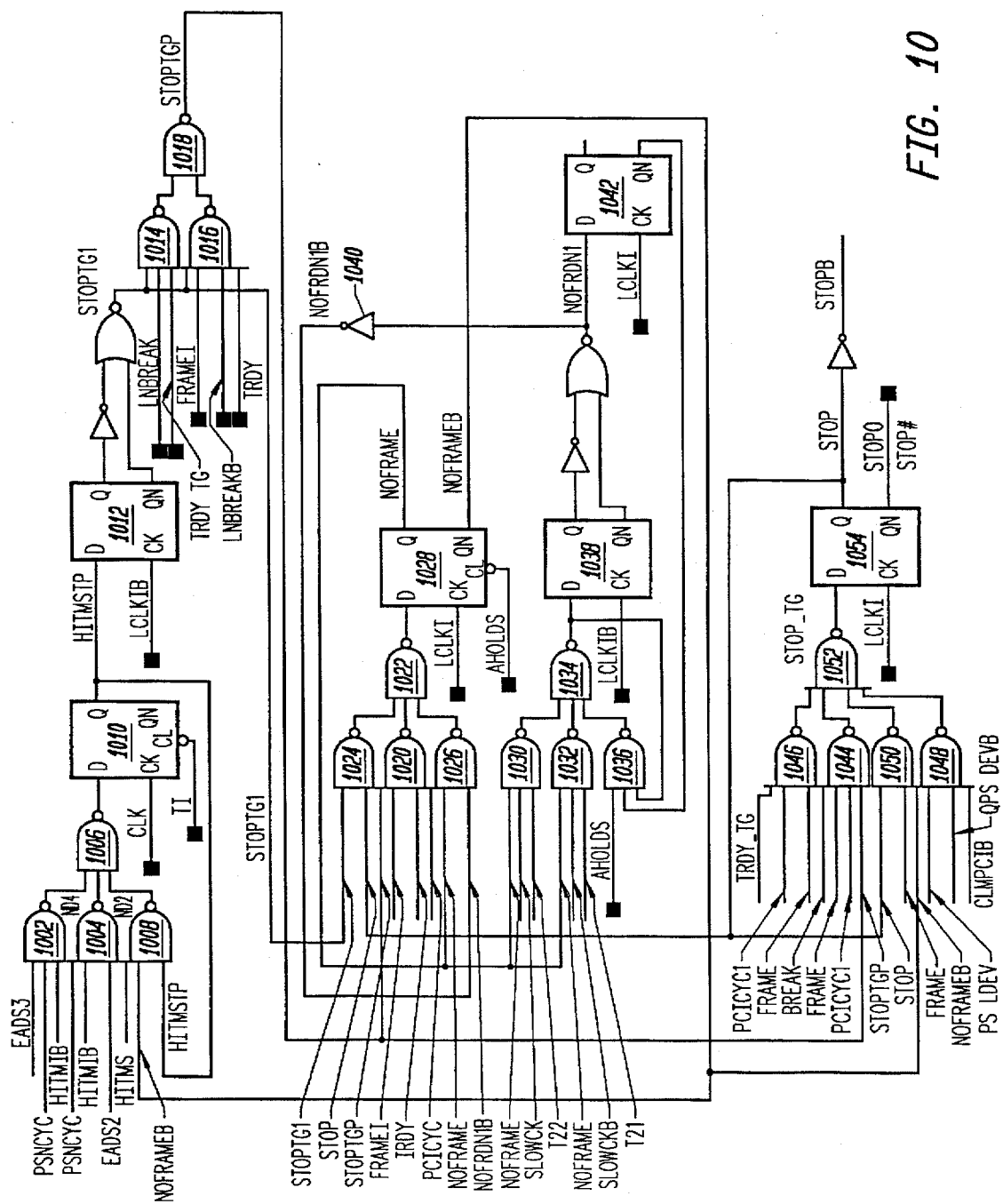

FIG. 10 is a schematic diagram of circuitry in the system controller 16 which produces the STOP# PCI-bus 118 signal. As previously explained, the circuitry should assert STOP# in response to HITM# asserted while a PCI burst transaction is taking place.

Referring to FIG. 10, a three-input NAND gate 1002 receives an EADS3 signal, a PSNCYC signal, and an HITMIB signal. EADS3 is asserted in the third HCLK cycle after EADS# is asserted, and PSNCYC is asserted only when a pre-snoop cycle is taking place. HITMIB is the inverse of the HITM# signal from the host processing subsystem 110. Thus, the output of NAND gate 1002 will go low only if HITM# has been asserted by the third HCLK cycle after EADS# was asserted (e.g., in advance of the HCLK rising edge which begins HCLK cycle 11, in FIG. 6). Similarly, NAND gate 1004 receives PSNCYC, HITMIB, an EADS2 signal and HITMS signal. HITMS is the programmable register bit which indicates that HITM# can be sampled as early as the second HCLK cycle after assertion of EADS# (e.g., on the HCLK rising edge which begins HCLK cycle 10, in FIG. 6). EADS2 goes high in this same HCLK cycle. Thus, if HITMS is asserted, the output of NAND gate 1004 will go low if HITM# has been asserted in advance of the second HCLK cycle after EADS# was asserted to the host processing subsystem 110.

The outputs of NAND gates 1002 and 1004 are provided to two inputs of a three-input NAND gate 1006, the third input of which is connected to the output of another NAND gate 1008 described below. The output of NAND gate 1006 is connected to the D input of a flip-flop 1010, the Q output of which, designated HITMSTP ("HITM# stop"), is connected back to one input of the NAND gate 1008. The other input of NAND gate 1008 receives a NOFRAMEB signal, which is initially high and carries a one PCICLK-cycle-wide low-going pulse when STOP# has been triggered. Flip-flop 1010 is clocked on the host bus clock signal CLK. Accordingly, it can be seen that HITMSTP will go high only if HITM# has been asserted during a pre-snoop cycle, within two or three HCLK cycles of the assertion of EADS#, and will remain high until STOP# has been triggered in the manner set forth below.

HITMSTP is connected to the D input of a flip-flop 1012, which is clocked by an inverted version of the PCICLK signal, designated LCLKIB. The QN output of flip-flop 1012 is NORed with an inverted version of the Q output of flip-flop 1012 to produce a STOPTG1 signal, which is connected to one input of a three-input NAND gate 1014. The other two inputs of NAND gate 1014 receive LNBREAK, which is asserted only if the current transfer is the last transfer in a line of secondary cache, and TRDY_TG, which carries a one PCICLK-cycle-wide high-going pulse in the PCICLK cycle immediately preceding that in which TRDY# will be asserted for such last transfer of the cache line. NAND gate 1014, therefore, carries a low-going version of STOPTG1, with the low-going transition delayed until one PCICLK cycle prior to the last TRDY# in the transfer of a line of secondary memory.

STOPTG1 is also connected to one input of a four-input NAND gate 1016, the other inputs of which are connected to receive FRAMEI (equivalent to the PCI-bus FRAME# signal), LNBREAKB (the inverse of LNBREAK), and TRDY (equivalent to the PCI-bus TRDY# signal). Essentially, therefore, NAND gate 1016 will carry an inverted version of STOPTG1, delayed to coincide with the assertion of TRDY# for the last transfer in the burst (master terminated), in the situation where the last data unit transferred is not the last data unit in the line of secondary memory.

The outputs of NAND gates 1014 and 1016 are NANDed together by a NAND gate 1018, the output of which, STOPTGP, goes high if HITM# was asserted during a predictive snoop, delayed either until the PCICLK cycle preceding the last TRDY# of a secondary memory line, or until the TRDY# of the last transfer of the burst, whichever occurs earlier. STOPTGP is high-going pulse having a width equal to one PCICLK cycle.

STOPTGP is connected to one input of a four-input NAND gate 1020, the other inputs of which are connected to FRAMEI, IRDY (equivalent to the inverse of the PCI-bus IRDY# signal) and PCICYC. Thus, NAND gate 1020 qualifies STOPTGP to ensure that a PCI cycle is currently taking place, and IRDY# and FRAME# are still asserted. The output of NAND gate 1020 is connected to one input of a three-input NAND gate 1022. A second input of NAND gate 1022 is connected to the output of a NAND gate 1024, which receives STOPTG1 (previously described) and STOP (equivalent to the inverse of STOP#). The third input of NAND gate 1022 is connected to the output of a NAND gate 1026, which receives NOFRAME and a signal NOFRDN1B, described below. The output of NAND gate 1022 is connected to the D input of an LCLKI-clocked flip-flop 1028, the Q output of which is the NOFRAME signal connected back to an input of NAND gate 1026. It can be seen that NOFRAME will be asserted by a flip-flop 1028 in the PCICLK cycle following that in which STOPTGP was asserted, assuming the master has not yet terminated the burst, and will remain asserted until either STOP# is asserted or the NOFRDN1B signal is negated.

The QN output of flip-flop 1028 is the NOFRAMEB signal which is connected back to the NAND gate 1008.

NOFRAME is also connected to one input of each of two NAND gates 1030 and 1032, which delay the transition as necessary to accommodate different speed clocks. These NAND gates are connected to respective inputs of a three-input NAND gate 1034, the third input of which is connected to the output of a NAND gate 1036. The NAND gate 1036 has three inputs, one of which receives AHOLDS, which can be assumed to remain high throughout the present description. The second input of NAND gate 1036 is connected to the output of NAND gate 1034, and the third input of NAND gate 1036 is connected as described below.

The output of NAND gate 1034 is connected to one input of a D flip-flop 1038, the QN output of which is NORed with an inverted version of the Q output of flip-flop 1038 to produce an NOFRDN1 signal. Flip-flop 1038 is clocked on LCLKIB. NOFRDN1 is inverted by an inverter 1040 to produce the NOFRDN1B signal provided to NAND gate 1026. NOFRDN1 is also connected to the D input of a flip-flop 1042, which is clocked on LCLKI, the QN output of which is connected back to the third input of NAND gate 1036. The effect of flip-flops 1028, 1038 and 1042, and their associated logic gates, is to make NOFRAME have a width of at least one PCICLK cycle and to ensure that the CPU has sufficient time to generate HITM#.

STOPTGP is also connected to one input of a three-input NAND gate 1044, which qualifies the signal once again to ensure that the current cycle is a PCI cycle and that the master has not yet negated FRAME# (because STOP# can be asserted only when FRAME# is active). The circuitry also includes two other NAND gates 1046 and 1048, each of which go low to trigger STOP# in situations not pertinent to the present invention. A fourth NAND gate 1050 receives FRAME and STOP as inputs. The outputs of NAND gates 1044, 1046, 1048 and 1050 are connected to respective inputs of a four-input NAND gate 1052, the output of which, designated STOP_TG, is connected to the D input of an LCLKI-clocked flip-flop 1054. The Q output of flip-flop 1054 is the STOP signal connected back to NAND gates 1050 and 1024, and the QN output of flip-flop 1054 is the output signal which drives STOP# on the PCI-bus 118. It can be seen, therefore, that STOP# will have a width of one PCICLK cycle in response to STOP# produced by NAND gate 1018.

C. Circuitry to Produce HOLD

Figure 11:
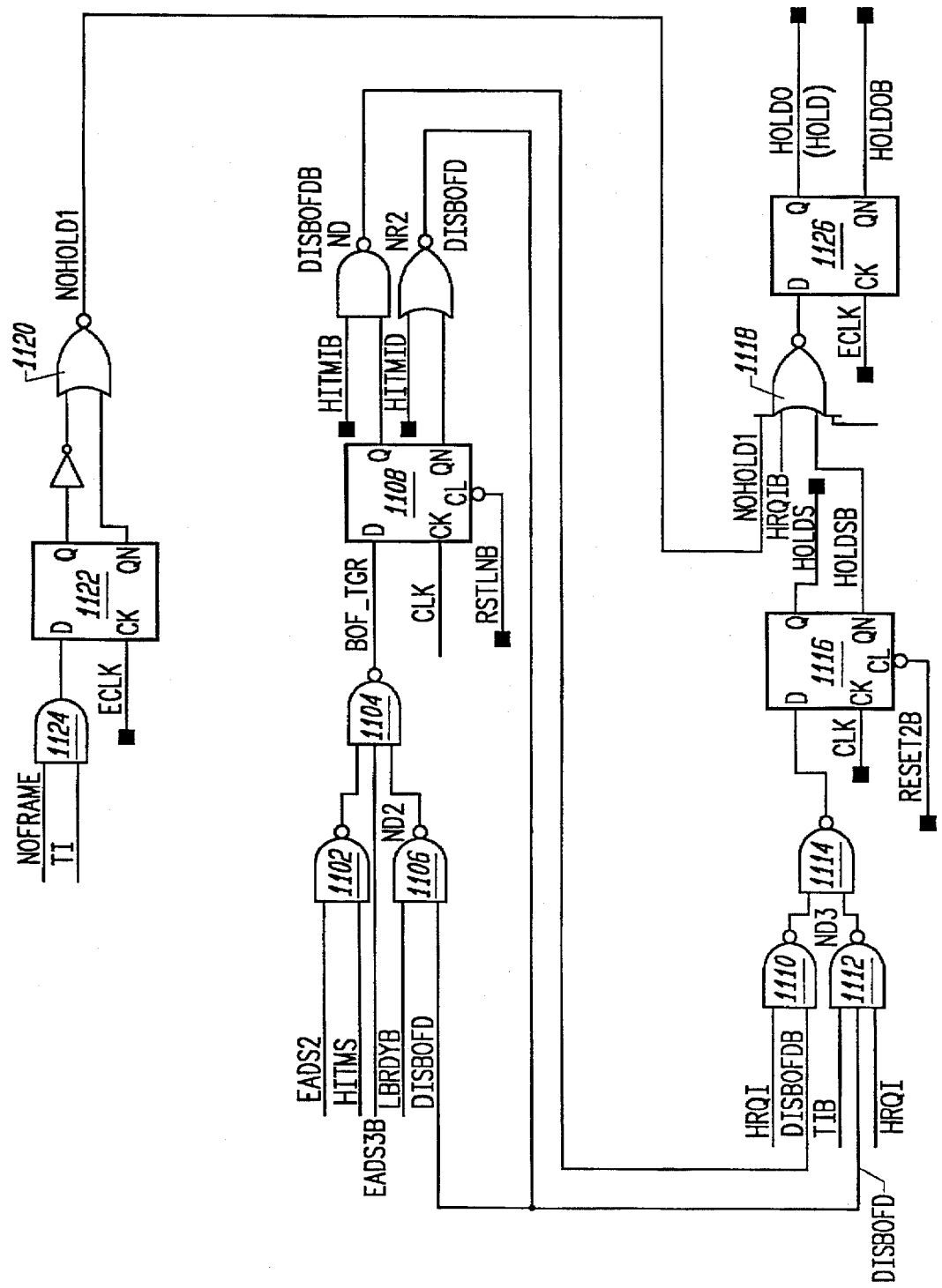

FIG. 11 illustrates circuitry in the system controller 116 which is used to produce the HOLD signal for the host processing subsystem 110. As previously described, HOLD is high in order for the system controller 116 to act as a master on the host bus 112, but goes low in order to allow the host processing subsystem 110 to perform a write-back cycle (see FIGS. 5 and 6). If the initial inquiry cycle at the beginning of a burst produces HITM# asserted, then the system controller 116 negates HOLD as soon as possible to permit the write-back to take place (FIG. 5). In a predictive snoop cycle, on the other hand, the circuitry delays negating HOLD until the last data unit transfer in the current cache line is taking place. AHOLD remains asserted during the entire time.

Referring to FIG. 11, a two-input NAND gate 1102 receives EADS2 and HITMS. The output of NAND gate 1102 is connected to one input of a three-input NAND gate 1104, a second input of which receives EADS3B which is the inverse of EADS3. The third input of NAND gate 1104 is connected to the output of a two-input NAND gate 1106, which receives LBRDYB (which goes low on the last BRDY# in a write-back cycle), and the other input of which receives a DISBOFD signal described below. The output BOF_TGR of NAND gate 1104 is connected to the D input of a flip-flop 1108, clocked by the host clock signal CLK. The Q output of flip-flop 1108 is NANDed with an HITMIB signal to produce a DISBOFDB signal, and the QN output of flip-flop 1108 is NORed with a HITMID signal to produce DISBOFD, fed back to NAND gate 1106. HITMIB is equivalent to the inverse of HITM#, and ITMID is equivalent to HITM#. It can be seen DISBOFD and DISBOFDB will be asserted (with their respective polarities) only if HITM# was asserted within the appropriate window (as determined by HITMS) after EADS# was asserted. DISBOFD/DISBOFDB will remain asserted until the last BRDY# of a write-back cycle.

DISBOFDB is connected to one input of a NAND gate 1110, the other input of which receives an HRQI signal which is high whenever the system controller 116 owns the host bus 112. DISBOFD is connected to one input of a three-input NAND gate 1112, a second input of which receives HRQI, and a third input of which receives a signal TIB. TIB is low when the CPU in host processing subsystem 110 is idle. The outputs of NAND gates 1110 and 1112 are NANDed together by a NAND gates 1114, the output of which is connected to the D input of a CLK-clocked flip-flop 1116. Thus, in the normal situation, when DISBOFDB is high, the Q output of flip-flop 1116 will be high indicating that HOLD should be asserted. In a HITM# situation, DISBOFD will be high and the Q output of flip-flop 1116 will go low when the CPU reaches an idle state.

The QN output of flip-flop 1116, designated HOLDSB, is qualified in NOR gate 1118 by HRQIB (the inverse of HRQI), a NOHOLD1 signal, and another signal not pertinent to the present invention. NOHOLD1 is connected to the output of a NOR gate 1120, one input of which receives the QN output of a flip-flop 1122 and the other input of which receives an inverted version of the Q output of flip-flop 1122. Flip-flop 1122 is clocked on ECLK, and its D input is connected to the output of an AND gate 1124, one input of which receives NOFRAME (FIG. 10) and the other input of which receives TL NOHOLD1 therefore has the effect of delaying a negative transition in the output of NOR gate 1118 until after STOP# has been triggered on the PCI-bus 118.

The output of NOR gate 1118 is connected to the D input of an ECLK-clocked flip-flop 1126, the Q output of which carries HOLDO and drives the host bus HOLD signal.

D. Circuitry to Generate TRDY# (LSTART1)

The system controller 116 includes a state machine which controls the PCI-bus 118. The state machine itself forms no part of the invention, except that it is qualified by an LSTART1 signal which is pertinent to the invention. LSTART1 is initially low, permitting assertion of EADS# at the beginning of a PCI master burst transaction. LSTART1 goes high only in response to HITM# sampled high (negated) at the appropriate time, or if HITM# was sampled asserted (low), on the last LBRDY# of the L1 cache write-back cycle. When LSTART1 goes high, it allows the PCI state machine to generate TRDY# in the normal course.

Figure 12:
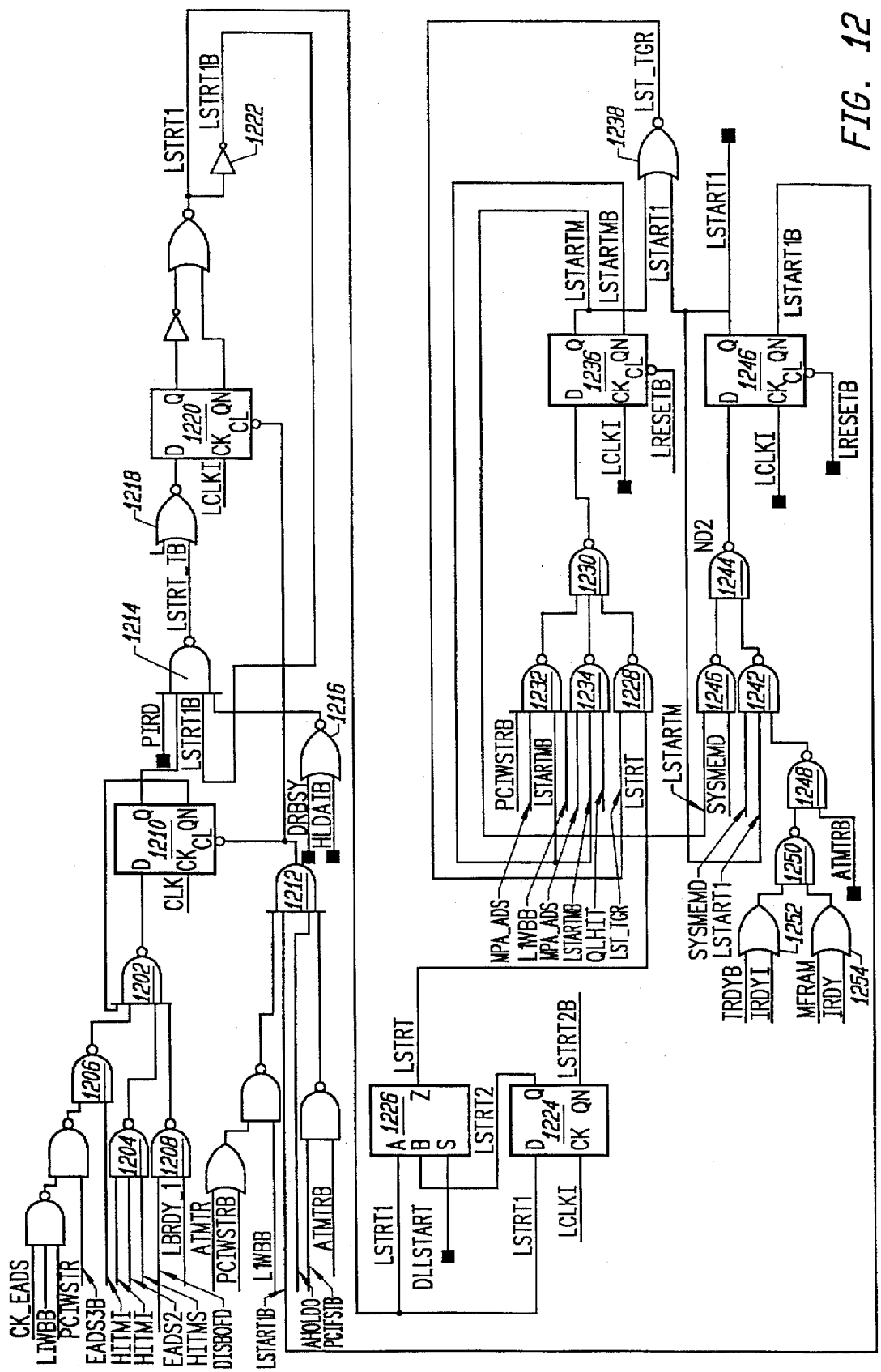

FIG. 12 is a schematic diagram of circuitry in the system controller 116 which generates the LSTART1 signal. Referring to FIG. 12, the circuitry comprises a four-input NOR gate 1202, one input of which is connected to the output of a NAND gate 1204 and a second input of which is connected to the output of NAND gate 1206. NAND gates 1204 and 1206 will output a logic zero in the second or third HCLK cycle after assertion of EADS#, respectively, depending on HITMS, only if the host processing subsystem 110 has not asserted HITM# by that time. There are additional qualifications to the timing for the HITM# test in NAND gate 1206, but these are unimportant for an understanding of the invention. A third input of NAND gate 1202 is connected to the output of another two-input NAND gate 1208, the two inputs of which are connected to receive the DISBOFD signal (FIG. 11) and an LBRDY_1 signal. DISBOFD is, it will be recalled, a precursor to negating HOLD to the host processing subsystem 110 after sampling HITM# asserted, and remains asserted until the fourth BRDY# of the write-back cycle. LBRDY_1 is another signal which goes high at a time which is related to the fourth BRDY# of the write-back cycle. Thus if the current L1 cache inquiry cycle yielded HITM# asserted, then neither NAND gates 1204 or 1206 go low, but NAND gate 1208 goes low at the end of the write-back cycle.

The output of NAND gate 1202 is connected to the D input of a flip-flop 1210, the QN output of which is connected back to the fourth input of NAND gate 1202. Flip-flop 1210 is clocked on CLK. Accordingly, once the Q output of flip-flop 1210 goes high, either as a result of HITM# negated after an L1 cache inquiry cycle or as a result of completion of an L1 cache write-back cycle because the desired line of data was cached modified in the L1 cache, the Q output of flip-flop 1210 will remain high until cleared. The inverting clear input of flip-flop 1210 is connected to the output of an AND gate 1212, which can clear flip-flop 1210 in response to a number of different conditions. The only condition pertinent to the present invention, however, is assertion of LSTART1B (complement of LSTART1). Thus, once the process to assert LSTART1 begins, flip-flop 1210 remains latched until LSTART1 has actually been asserted.

The Q output of flip-flop 1210 is connected to one input of a four-input NAND gate 1214, the output of which is designated LSTRT_TB. NAND gate 1214 qualifies LSTRT_TB with a PIRD signal and with the output of a NOR gate 1216. On a read access, PIRD forces LSTRT_TB to await assertion of IRDY# on a PCI master read access. The NOR gate 1216 forces LSTRT_TB to wait for the CPU to relinquish the host bus (HLDA).

LSTRT_TB is connected to one input of a NOR gate 1218, the other input of which receives a signal which can be assumed herein to remain low at all times pertinent to the invention. The output of NOR gate 1218 is connected to the D input of another flip-flop 1220, which is clocked on LCLKI. The inverting clear input of flip-flop 1220 is connected to the same output of AND gate 1212 which clears flip-flop 1210. The QN output of flip-flop 1220 is NORed with an inverted version of a Q output of flip-flop 1220 to produce an LSTRT1 signal. LSTRT1 is inverted by an inverter 1222 and fed back as LSTRT1B to a fourth input af NAND gate 1214. Thus, after qualifications, LSTRT1 goes high, synchronously with PCICLK, after HITM#=1 or after HITM#=0 and the write-back cycle is complete.

LSTRT1 is optionally delayed by one further PCICLK cycle by flip-flop 1224 and multiplexer 1226, depending on a programmable register bit DLLSTART, and the result (designated LSTRT) is connected to one input of a NAND gate 1228. The other input of NAND gate 1228 receives an LST_TGR signal, described below. The output of NAND gate 1228 is connected to one input of a three-input NAND gate 1230, the other two inputs of which are connected to the outputs of two other respective NAND gates 1232 and 1234. The output of NAND gate 1230 is connected to the D input of another LCLKI-clocked flip-flop 1236, the QN output of which, designated LSTARTMB, is fed back to inputs of the NAND gates 1232 and 1234. The other inputs of NAND gates 1232 and 1234 are unimportant for an understanding of the invention, and therefore are not described herein.

The Q output of flip-flop 1236, LSTARTM, is connected to one input of a NOR gate 1238, the output of which is the LST_TGR signal fed back to NAND gate 1228. The other input of NOR gate 1238 receives the LSTART1 signal as described hereinafter. LSTARTM is also connected to one input of another NAND gate 1240, the other input of which receives SYSMEMD (high when the specified address is within the DRAM 128 address space). SYSMEMD is also connected to one input of a three-input NAND gate 1242, a second input of which receives LSTART1. The outputs of NAND gates 1240 and 1242 are connected to respective inputs of another NAND gate 1244, the output of which is connected to the D input of an LCLKI-clocked flip-flop 1246. The Q output of flip-flop 1246 forms the LSTART1 signal, connected as previously described to one input of NOR gate 1238 and to one input of NAND gate 1242. The QN output of flip-flop 1246 is the LSTART1B signal which is fed back to AND gate 1212 as previously described. It can be seen that after LSTRT causes LSTARTM to go high, LST_TGR will go low, causing LSTARTM to go low again in the next PCICLK cycle. LST_TGR will not go high at this time, however, because when LSTARTM went high, it caused LSTART1 to also go high in the next PCICLK cycle, thereby maintaining LST_TGR low.

LSTART1 is fed back into NAND gate 1242, thereby latching LSTART1 in a high state until the third input of NAND gate 1242 goes low. This input of NAND gate 1242 is connected to the output of a NAND gate 1248, one input of which can be assumed to remain high, and the other input of which is connected to the output of a NAND gate 1250. One input of NAND gate 1250 is connected to the output of an OR gate 1252, which receives TRDYB (equivalent to TRDY#) and IRDYI (equivalent to IRDY#). The other input of NAND gate 1250 is connected to the output of an OR gate 1254, one input of which receives MFRAM (equivalent to the inverse of FRAME#) and the other input of which receives IRDY (equivalent to the inverse of IRDY#). Thus the third input of NAND gate 1242 will go low when the first PCI transfer takes place (TRDY# and IRDY#, both asserted), or when the PCI master 138 terminates the burst (FRAME# and IRDY#, both negated), whichever occurs first. In either of these situations, LSTART1 will go low. Flip-flops 1210 and 1220 will also be cleared at this time due to the feedback of LSTART1B through AND gate 1212 to the inverting clear inputs of these flip-flops.

Note that LSTART1 is further delayed from allowing the PCI state machine to proceed, by other circuitry in the system controller 116, until any predictive snoop then taking place has had a chance to finish. This can be the case when the first data unit that was accessed as part of burst transfer was the second-to-last data unit in a line of secondary memory, as described above with respect to FIG. 7. It can also be the case if the first data unit was the third-to-last data unit in a line of secondary memory, where the system controller 116 has been programmed to sample HITM# on the second rising edge of HCLK after EADS# was asserted.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A method for transferring a plurality of data units between a bus master and a respective plurality of memory locations at sequential memory location addresses in an address space of a secondary memory, for use with a host processing unit and a first cache memory which caches memory locations of said secondary memory for said host processing unit, said first cache memory having a line size of l bytes, comprising the steps of:

sequentially transferring data units between said bus master and said secondary memory beginning at a starting memory location address in said secondary memory address space and continuing beyond an l-byte boundary of said secondary memory address space, said sequentially transferred data units including a last data unit before said l-byte boundary and a first data unit beyond said l-byte boundary; and initiating a next-line inquiry, prior to completion of the transfer of the last data unit before said l-byte boundary, to determine whether an N+1'th l-byte line of said secondary memory is cached in a modified state in said first cache memory, said N+1'th l-byte line being a line of said secondary memory which includes said first data unit beyond said l-byte boundary.

2. A method according to claim 1, further comprising, if said next-line inquiry determines that said N+1'th l-byte line of secondary memory is cached in a modified state in said first cache memory, the steps of:

stopping said step of sequentially transferring data units at said l-byte boundary; and continuing said step of sequentially transferring data units beyond said l-byte boundary after a write-back of said N+1'th l-byte line from said first cache memory to said secondary memory.

3. A method according to claim 1, wherein said secondary memory includes a tertiary memory and further includes a second cache memory which caches memory locations of said tertiary memory for said host processing unit and said first cache memory in combination.

4. A method according to claim 1, further comprising, prior to said step of sequentially transferring, the steps of:

receiving an indication of said starting memory location address from said bus master; and initiating a first inquiry of whether an N'th l-byte line of said secondary memory is cached in a modified state in said first cache memory, said N'th l-byte line being a line of said secondary memory which includes the data unit of said starting memory location address, said first inquiry returning negatively if the N'th l-byte line is not cached in the modified state and issuing a write-back cycle if the N'th l-byte line is cached in a modified state, wherein said next-line inquiry is initiated at a time responsive to the time that said first inquiry returns negatively or that said write-back cycle completes, whichever occurs in response to said first inquiry, and wherein said time that said next-line inquiry is initiated is not responsive to the time of said transfer of said last data unit before said l-byte boundary.

5. A method according to claim 1, wherein said starting memory location address is not the address of the last data unit before said l-byte boundary, further for transferring a second plurality of data units between said bus master and a second respective plurality of memory locations at sequential memory location addresses in said secondary memory address space, beginning with a second starting memory location address which is the address of the highest data unit in an M'th l-byte line of said secondary memory, further comprising the steps of:

transferring said highest data unit between said bus master and said secondary memory;

initiating a second inquiry to determine whether the M+1'th l-byte line of said secondary memory is cached in a modified state in said first cache memory, said second inquiry returning negatively if the M+1'th l-byte line is not cached in the modified state and issuing a write-back cycle if the M+1'th l-byte line is cached in a modified state; and sequentially transferring data units between said bus master and said secondary memory beginning at the first memory location address in said M+1'th l-byte line only after said second inquiry returns negatively or said write-back cycle completes, whichever occurs in response to said second inquiry.

6. A method according to claim 5, wherein said step of transferring said highest data unit occurs after said step of initiating a second inquiry.

7. A method according to claim 1, wherein said bus master is a PCI bus master, wherein said first cache memory includes an instruction cache and a data cache, and wherein said host processing unit and said first cache memory are fabricated on a single CPU chip.

8. A method according to claim 1, wherein said next-line inquiry takes place concurrently with at least one of the data unit transfers in said step of sequentially transferring.

9. A method for transferring data between a bus master and a plurality of memory locations at respective addresses in an address space of a secondary memory, for use with a host processing unit and a first cache memory which caches memory locations of said secondary memory for said host processing unit, said first cache memory having a line size of l bytes, comprising the steps of:

sequentially transferring at least three data units between said bus master and said secondary memory beginning at a first starting memory location address in said secondary memory address space and continuing sequentially beyond an l-byte boundary of said secondary memory address space; and prior to completion of the transfer of the first data unit beyond said l-byte boundary, determining whether an N+1'th l-byte line of said secondary memory is cached in a modified state in said first cache memory, said N+1'th l-byte line being the line of said secondary memory which includes said first data unit beyond said l-byte boundary, all of said transfers of data units in said step of sequentially transferring, occurring at a constant rate.

10. A method for use with a host processing subsystem, a bus master and memory locations addressable in a secondary memory address space, wherein said host processing subsystem includes a CPU and a first cache memory which caches memory locations of said secondary memory address space for said CPU, said first cache memory having a line size of l bytes, said host processing subsystem operating to return, in response to a secondary memory line address specified to said host processing subsystem and the assertion of an inquiry signal to said host processing subsystem, a hit modified indication of whether the specified secondary memory line is cached in a modified state in said first cache memory, and wherein said bus master transfers data with said memory locations according to a transaction protocol in which said bus master specifies a starting data unit address for said transaction, comprising, in response to initiation of a first transaction and specification by said bus master of a first starting address being the data unit address in the secondary memory address space of a first starting data unit, the steps of:

specifying to said host processing subsystem, the line address of an N'th l-byte line of said secondary memory address space and asserting said inquiry signal a first time, said N'th l-byte line being the line of said secondary memory address space which includes said first starting data unit, after receiving said hit modified indication from said host processing subsystem in response to said inquiry signal, indicating that said N'th l-byte line of said secondary memory address space is cached in a modified state, transferring data units between said bus master and memory locations in said secondary memory address space according to said first transaction; and after receiving said hit modified indication, but not in response to completion of any transfer of said first transaction, specifying to said host processing subsystem the line address of the N+1'th l-byte line of said secondary memory address space and asserting said inquiry signal a second time.

11. A method according to claim 10, wherein in said transaction protocol, data units are transferred sequentially after said bus master specifies a starting data unit, until said transaction is terminated, no further address specification by said bus master being necessary during said transaction.

12. A method according to claim 10, wherein said bus master is a PCI bus master, and wherein said initiation of a first transaction comprises assertion by said bus master of the PCI-bus FRAME# and IRDY# signals.

13. A method according to claim 10, further comprising, if said hit modified indication from said host processing subsystem is asserted in response to said first assertion of said inquiry signal, the step of awaiting completion of a write-back cycle by said host processing subsystem prior to said step of transferring data units.

14. A method according to claim 10, wherein said hit modified indication is considered received on an n'th rising edge transition of a clock signal which occurs after said first assertion of said inquiry signal, n being a predefined integer greater than 0.

15. A method according to claim 10, wherein said first starting data unit is not the highest data unit in said N'th l-byte line of said secondary memory address space.

16. A method according to claim 10, wherein in said transaction protocol, data units are transferred sequentially after said bus master specifies a starting data unit, until said transaction is terminated, and wherein said first transaction is not terminated prior to the transfer of the first data unit in said N+1'th l-byte line of said secondary memory address space.

17. A method according to claim 10, wherein in said transaction protocol, data units are transferred sequentially after said bus master specifies a starting data unit, until said transaction is terminated, and wherein, if said host processing subsystem returns said hit modified indication unasserted in response to said second assertion of the inquiry signal, said first transaction is not terminated prior to the transfer of the first data unit in said N+1'th l-byte line of said secondary memory address space.

18. A method according to claim 17, further comprising, if said first transaction is not terminated prior to the transfer of the first data unit in said N+1'th l-byte line of said secondary memory address space, the step of, after transfer of the last data unit in said Nth l-byte line of said secondary memory address space, and before transfer of the last data unit in said N+1'th l-byte line of said secondary memory address space, specifying to said host processing subsystem the line address of the N+2'th l-byte line of said secondary memory address space and asserting said inquiry signal a third time.

19. A method according to claim 18, wherein, if said host processing subsystem returns said hit modified indication unasserted in response to said third assertion of said inquiry signal, said first transaction is not terminated prior to the transfer of the first data unit in said N+2'th l-byte line of said secondary memory address space.

20. A method for use with a first processing subsystem, a second processing subsystem and memory locations addressable in a memory address space, wherein said first processing subsystem includes a first address-providing unit and a first cache memory which caches memory locations of said memory address space for said first address-providing unit, said first cache memory having a line size of l bytes, said first processing subsystem operating to return, in response to a memory line address specified to said first processing subsystem and the assertion of an inquiry signal (EADS#) to said first processing subsystem, a hit modified indication of whether the specified memory line is cached in a modified state in said first cache memory, and wherein said second processing subsystem transfers data with said memory locations according to a transaction protocol in which said second processing subsystem specifies a starting data unit address for said transaction, comprising, in response to specification by said second processing subsystem of a first starting address being the data unit address in the memory address space of a first starting data unit, and initiation of a first transaction, the steps of:

specifying to said first processing subsystem, the line address of an N'th l-byte line of said memory address space and asserting said inquiry signal a first time, said N'th l-byte line being the line of said memory address space which includes said first starting data unit;

after receiving said hit modified indication from said first processing subsystem in response to said inquiry signal, transferring data units between said second processing subsystem and memory locations in said memory address space according to said first transaction; and after receiving said hit modified indication, but not in response to completion of any transfer of said first transaction, specifying to said first processing subsystem the line address of the N+1'th l-byte line of said memory address space and asserting said inquiry signal a second time.

21. Apparatus for transferring a plurality of data units between a bus master and a respective plurality of memory locations at sequential memory location addresses in an address space of a secondary memory, for use with a host processing unit and a first cache memory which caches memory locations of said secondary memory for said host processing unit, said first cache memory having a line size of l bytes, comprising:

means for sequentially transferring data units between said bus master and said secondary memory beginning at a starting memory location address in said secondary memory address space and continuing beyond an l-byte boundary of said secondary memory address space, said sequentially transferred data units including a last data unit before said l-byte boundary and a first data unit beyond said l-byte boundary; and means for initiating a next-line inquiry, prior to completion of the transfer of the last data unit before said l-byte boundary, to determine whether an N+1'th l-byte line of said secondary memory is cached in a modified state in said first cache memory, said N+1'th l-byte line being a line of said secondary memory which includes said first data unit beyond said l-byte boundary.

22. Apparatus according to claim 21, further comprising means for, if said next-line inquiry determines that said N+1'th l-byte line of secondary memory is cached in a modified state in said first cache memory:

stopping said step of sequentially transferring data units at said l-byte boundary; and continuing said step of sequentially transferring data units beyond said l-byte boundary after a write-back of said N+1'th l-byte line from said first cache memory to said secondary memory.

23. Apparatus according to claim 21, wherein said secondary memory includes a tertiary memory and further includes a second cache memory which caches memory locations of said tertiary memory for said host processing unit and said first cache memory in combination.

24. Apparatus according to claim 21, wherein said starting memory location address is not the address of the last data unit before said l-byte boundary, further for transferring a second plurality of data units between said bus master and a second respective plurality of memory locations at sequential memory location addresses in said secondary memory address space, beginning with a second starting memory location address which is the address of the highest data unit in an M'th l-byte line of said secondary memory, further comprising:

means for transferring said highest data unit between said bus master and said secondary memory;

means for initiating a second inquiry to determine weather the M+1'th l-byte line of said secondary memory is cached in a modified state in said first cache memory, said second inquiry returning negatively if the M+1'th l-byte line is not cached in the modified state in and issuing a write-back cycle if the M+1'th l-byte line is cached in a modified state; and means for sequentially transferring data units between said bus master and said secondary memory beginning at the first memory location address in said M+1'th l-byte line only after said second inquiry returns negatively or said write-back cycle completes, whichever occurs in response to said second inquiry.

25. Apparatus according to claim 21, wherein said bus master is a PCI bus master, wherein said first cache memory includes an instruction cache and a data cache, and wherein said host processing unit and said first cache memory are fabricated on a single CPU chip.

26. Apparatus for transferring data between a bus master and a plurality of memory locations at respective addresses in an address space of a secondary memory, for use with a host processing unit and a first cache memory which caches memory locations of said secondary memory for said host processing unit, said first cache memory having a line size of l bytes, comprising:

means for sequentially transferring at least three data units between said bus master and said secondary memory beginning at a first starting memory location address in said secondary memory address space and continuing sequentially beyond an l-byte boundary of said secondary memory address space; and means for, prior to completion of the transfer of the first data unit beyond said l-byte boundary, determining whether an N+1'th l-byte line of said secondary memory is cached in a modified state in said first cache memory, said N+1'th l-byte line being the line of said secondary memory which includes said first data unit beyond said l-byte boundary, said means for sequentially transferring, transferring all of said data units at a constant rate.

27. Apparatus comprising a host processing subsystem, a bus master and memory locations addressable in a secondary memory address space, wherein said host processing subsystem includes a CPU and a first cache memory which caches memory locations of said secondary memory address space for said CPU, said first cache memory having a line size of l bytes, said host processing subsystem operating to return, in response to a secondary memory line address specified to said host processing subsystem and the assertion of an inquiry signal to said host processing subsystem, a hit modified indication of whether the specified secondary memory line is cached in a modified state in said first cache memory, and wherein said bus master transfers data with said memory locations according to a transaction protocol in which said bus master specifies a starting data unit address for said transaction, said apparatus further comprising:

means for specifying to said host processing subsystem, the line address of an N'th l-byte line of said secondary memory address space and asserting said inquiry signal a first time, said N'th l-byte line being the line of said secondary memory address space which includes a first starting data unit specified by said bus master in initiating a first transaction;

means for, after receiving said hit modified indication from said host processing subsystem in response to said inquiry signal, indicating that said N+1'th l-byte line of said secondary memory address space is cached in a modified state, transferring data units between said bus master and memory locations in said secondary memory address space according to said first transaction; and means for, after receiving said hit modified indication, but not in response to completion of any transfer of said first transaction, specifying to said host processing subsystem the line address of the N+1'th l-byte line of said secondary memory address space and asserting said inquiry signal a second time.

28. Apparatus according to claim 27, wherein in said transaction protocol, data units are transferred sequentially after said bus master specifies a starting data unit, until said transaction is terminated, no further address specification by said bus master being necessary during said transaction.

29. Apparatus according no claim 27, wherein said bus master is a PCI bus master, and wherein said initiation of a first transaction comprises assertion by said bus master of PCI-bus FRAME# and IRDY# signals.

30. Apparatus according to claim 27, wherein, if said hit modified indication from said host processing subsystem is asserted in response to said first assertion of said inquiry signal, said means for transferring data units awaits completion of a write-back cycle by said host processing subsystem prior to transferring data units according to said first transaction.

31. Apparatus according to claim 27, wherein said hit modified indication is considered received on an n'th rising edge transition of a clock signal which occurs after said first assertion of said inquiry signal, n being a predefined integer greater than 0.

32. Apparatus according to claim 27, wherein said first starting data unit is not the highest data unit in said N'th l-byte line of said secondary memory address space.

33. Apparatus according to claim 27, wherein in said transaction protocol, data units are transferred sequentially after said bus master specifies a starting data unit, until said transaction is terminated, and wherein said first transaction is not terminated prior to the transfer of the first data unit in said N+1'th l-byte line of said secondary memory address space.

34. Apparatus according to claim 27, wherein in said transaction protocol, data units are transferred sequentially after said bus master specifies a starting data unit, until said transaction is terminated, and wherein, if said host processing subsystem returns said hit modified indication unasserted in response to said second assertion of the inquiry signal, said first transaction is not terminated prior to the transfer of the first data unit in said N+1'th l-byte line of said secondary memory address space.

35. Apparatus for use with a first processing subsystem, a second processing subsystem and memory locations addressable in a memory address space, wherein said first processing subsystem includes a first address-providing unit and a first cache memory which caches memory locations of said memory address space for said first address-providing unit, said first cache memory having a line size of l bytes, said first processing subsystem operating to return, in response to a memory line address specified to said first processing subsystem and the assertion of an inquiry signal to said first processing subsystem, a hit modified indication of whether the specified memory line is cached in a modified state in said first cache memory, and wherein said second processing subsystem transfers data with said memory locations according to a transaction protocol in which said second processing subsystem specifies a starting data unit address for said transaction, comprising:

means for specifying to said first processing subsystem, the line address of an N'th l-byte line of said memory address space and asserting said inquiry signal a first time, said N'th l-byte line being the line of said memory address space which includes a first starting data unit specified by said second processing subsystem in initiating a first transaction;

means for, after receiving said hit modified indication from said first processing subsystem in response to said inquiry signal, transferring data units between said second processing subsystem and memory locations in said memory address space according to said first transaction; and means for, after receiving said hit modified indication, but not in response to completion of any transfer of said first transaction, specifying to said first processing subsystem the line address of the N+1'th l-byte line of said memory address space and asserting said inquiry signal a second time.

* * * * *